United States Patent [19]

Pennebaker et al.

[11] Patent Number: 4,885,576

[45] Date of Patent: Dec. 5, 1989

[54] SOFT COPY DISPLAY OF FACSIMILE IMAGES

[75] Inventors: William B. Pennebaker, Carmel; Joan L. Mitchell, Ossining; Frederick C. Mintzer, Shrub Oak, all of N.Y.

[73] Assignee: International Business Machines Corporation, Armonk, N.Y.

[21] Appl. No.: 847,376

[22] Filed: Apr. 2, 1986

[51] Int. Cl.[4] ............................................. G09G 3/36
[52] U.S. Cl. .................................. 340/793; 340/731; 340/799; 382/56; 358/261.1
[58] Field of Search ................ 340/793, 726, 728, 731, 340/703, 701, 798, 702, 721, 750, 799; 364/521; 382/56; 358/260, 261

[56] References Cited

U.S. PATENT DOCUMENTS

| | | | |
|---|---|---|---|
| 4,342,991 | 8/1982 | Pope et al. | 340/726 |
| 4,437,093 | 3/1984 | Bradley | 340/726 |
| 4,486,785 | 12/1984 | Lasher et al. | 340/728 |
| 4,509,043 | 4/1985 | Mossaides | 340/703 |
| 4,528,693 | 7/1987 | Pearson et al. | 340/793 |
| 4,531,160 | 7/1985 | Ehn | 340/793 |
| 4,550,315 | 10/1985 | Bass et al. | 340/799 |
| 4,559,531 | 12/1985 | Buynak | 340/703 |
| 4,567,515 | 1/1986 | Schumacher | 358/107 |
| 4,604,615 | 8/1986 | Funahashi | 340/798 |
| 4,610,026 | 9/1986 | Tabata et al. | 340/731 |
| 4,663,617 | 5/1987 | Stockwell | 340/726 |
| 4,664,319 | 2/1987 | Yamaguchi | 340/728 |
| 4,688,033 | 8/1987 | Carini et al. | 340/799 |

OTHER PUBLICATIONS

Hunter et al.,—"International Digital Facsimile Coding Standards"—Jul. 1980—Proceedings of IEEE, vol. 68, No. 7, pp. 845–867.

Primary Examiner—Gerald Brigance
Assistant Examiner—M. Fatahi-Yar
Attorney, Agent, or Firm—Thomas P. Dowd

[57] ABSTRACT

Digital data defining images are stored in a multiplane buffer. The buffer may store plural images by restricting data corresponding to an image or image portion to storage in less than half the bit planes of the buffer. An image is displayed by reading data from the buffer and selectively passing only a portion of the data read to a display. The data defining the images may be converted from facsimile (single bit per pixel) to gray scale format (multiple bits per pel) before being written to the buffer. The conversion relies on a table storing data definitive of the effect, on the image, of a facsimile transition (1/0 or 0/1) as a function of the location of the transition. Conversion from facsimile to gray scale is effected by examining the facsimile data for data transition and summing the effect of each of the transitions to convert a segment of facsimile data to gray scale data.

A system is also disclosed for rapidly converting an image in run-end form to a reduced-resolution gray-tone image.

37 Claims, 30 Drawing Sheets

FIG. 11
| FIRST BLACK BIT | TABLE ASSUMED STATES | | | | | | BLACKS A | B | OUTPUT STATES LOW RES A | B | HIGH RES A | B |
|---|---|---|---|---|---|---|---|---|---|---|---|---|
| 0 | B | B | B | B | B | B | 3 | 3 | C | C | 6 | 6 |
| 1 | W | B | B | B | B | B | 2 | 3 | 8 | C | 4 | 6 |
| 2 | W | W | B | B | B | B | 1 | 3 | 4 | C | 2 | 6 |
| 3 | W | W | W | B | B | B | 0 | 3 | 0 | C | 0 | 6 |
| 4 | W | W | W | W | B | B | 0 | 2 | 0 | 8 | 0 | 4 |
| 5 | W | W | W | W | W | B | 0 | 1 | 0 | 4 | 0 | 2 |
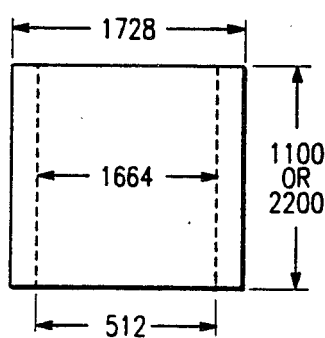
FIG. 12
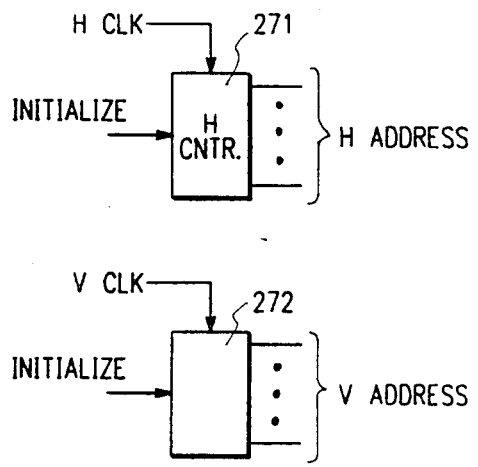
FIG. 13
ADDRESS REG. 70

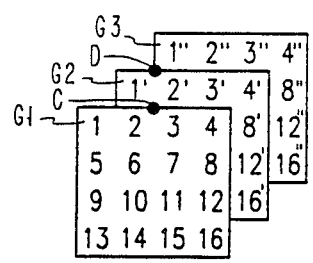

FIG.15A

| | | | | | | | |
|---|---|---|---|---|---|---|---|
| 1 | 2 | 3 | 4 | 1' | 2' | 3' | 4' |
| 5 | 6 | 7 | 8 | 5' | 6' | 7' | 8' |
| 9 | 10 | 11 | 12 | 9' | 10' | 11' | 12' |
| 13 | 14 | 15 | 16 | 13' | 14' | 15' | 16' |
| 1" | 2" | 3" | 4" | 1‴ | 2‴ | 3‴ | 4‴ |
| 5" | 6" | 7" | 8" | 5‴ | 6‴ | 7‴ | 8‴ |
| 9" | 10" | 11" | 12" | 9‴ | 10‴ | 11‴ | 12‴ |
| 13" | 14" | 15" | 16" | 13‴ | 14‴ | 15‴ | 16‴ |

I, A, II, B, III, IV

| 12 | 9' | 10' | 11' |
|---|---|---|---|
| 16 | 13' | 14' | 15' |
| 4" | 1‴ | 2‴ | 3‴ |
| 8" | 5‴ | 6‴ | 7‴ |

FIG.15D

| 14 | 15 | 16 | 13' |
|---|---|---|---|
| 2" | 3" | 4" | 1‴ |
| 6" | 7" | 8" | 5‴ |
| 10" | 11" | 12" | 9‴ |

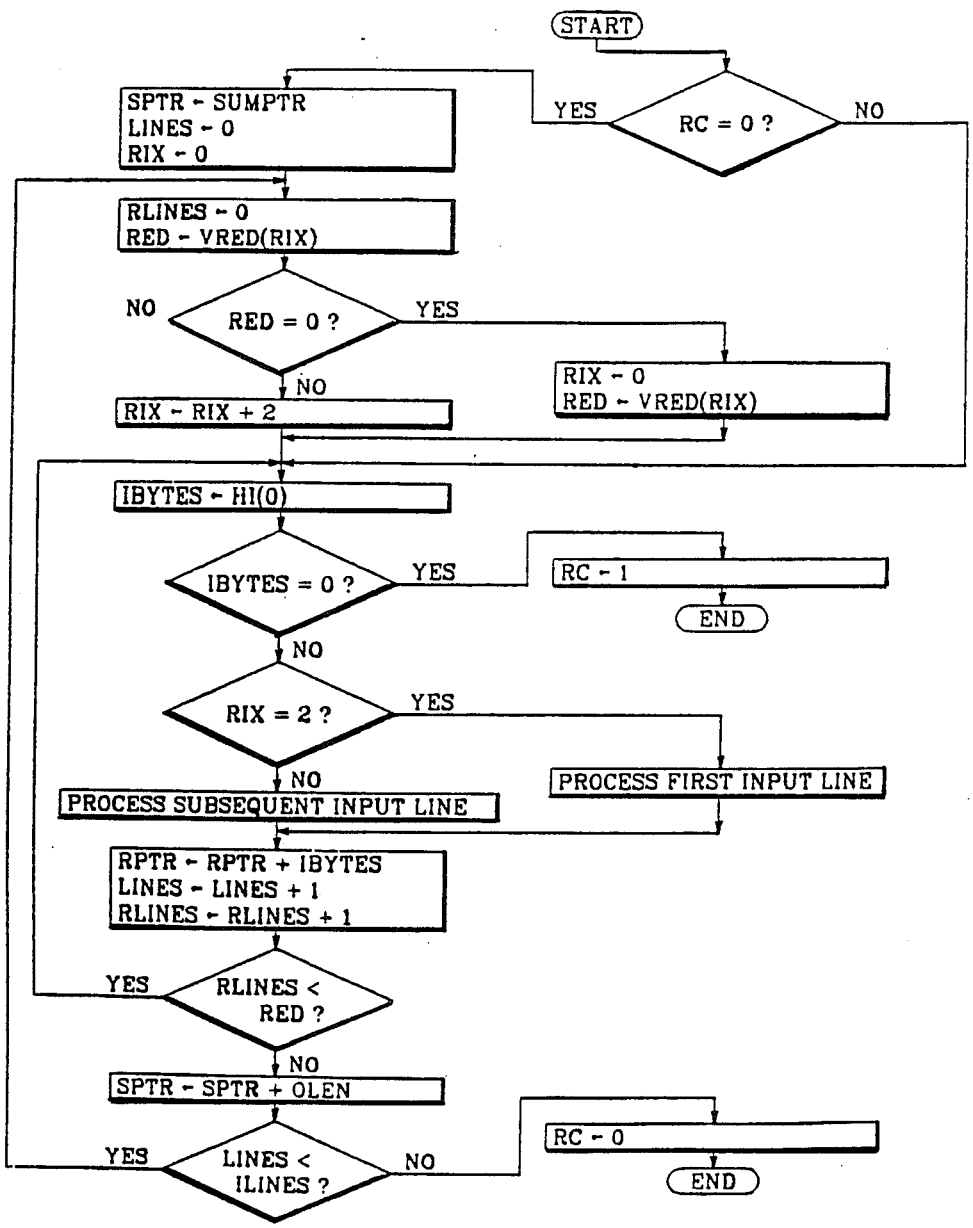
Fig. 16. Processing to convert runs to sums of pels.

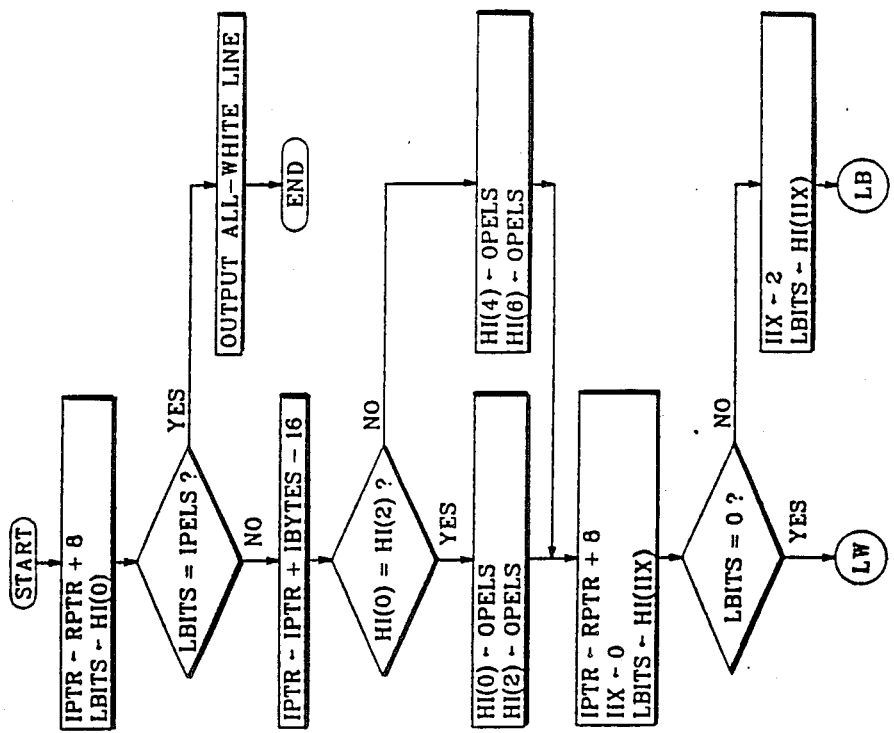
Fig. 17. Initializations to convert line of runs to sums.

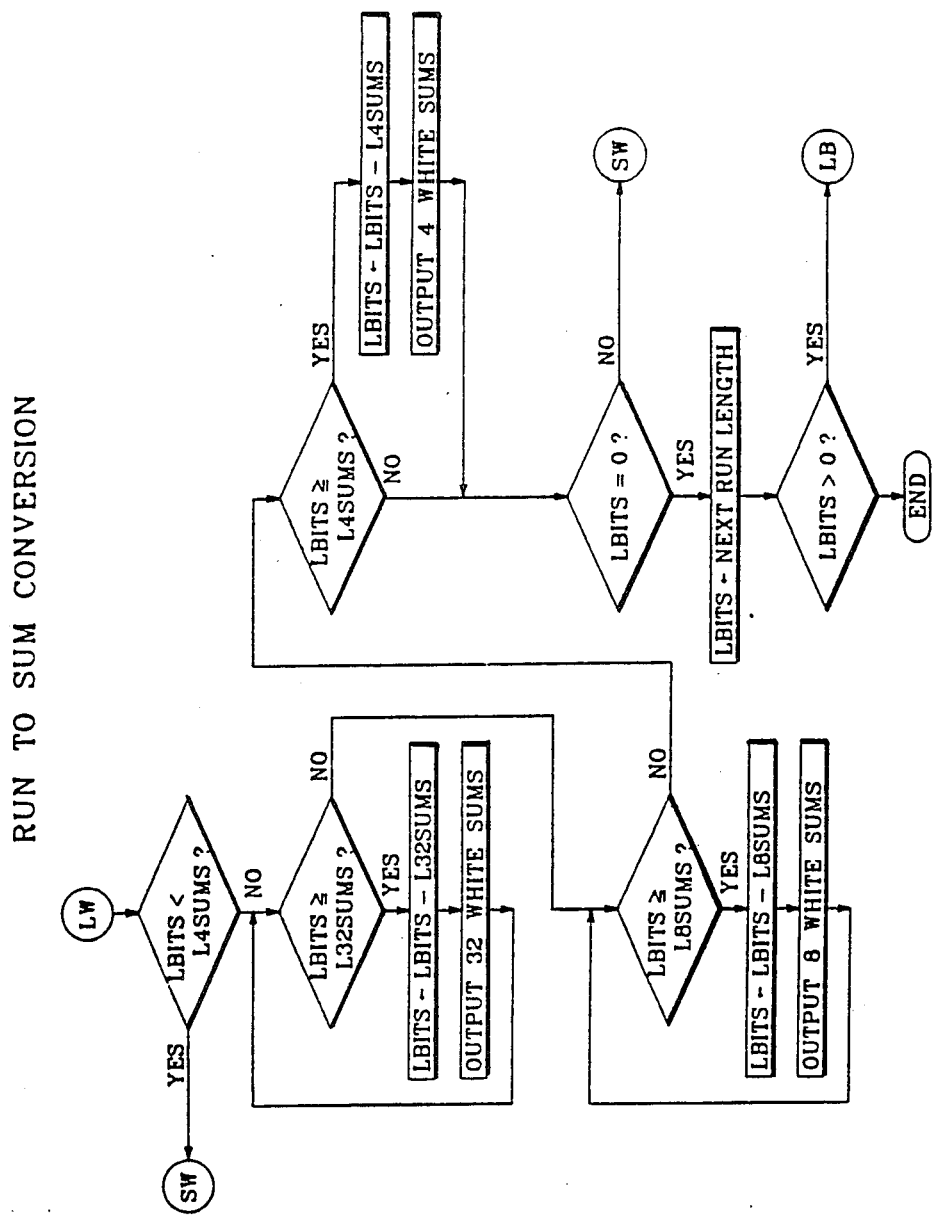
Fig. 18. Processing for long white runs.

RUN TO SUM CONVERSION
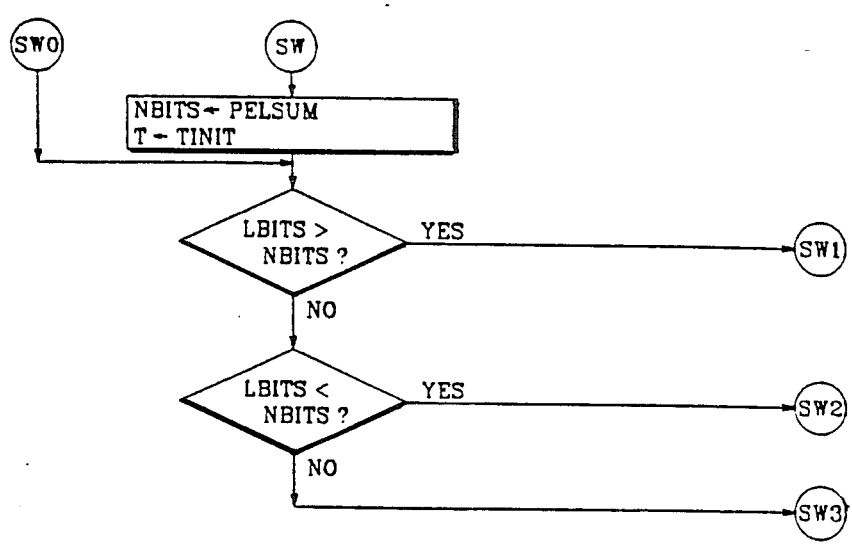
Fig. 19. Processing for short white runs.

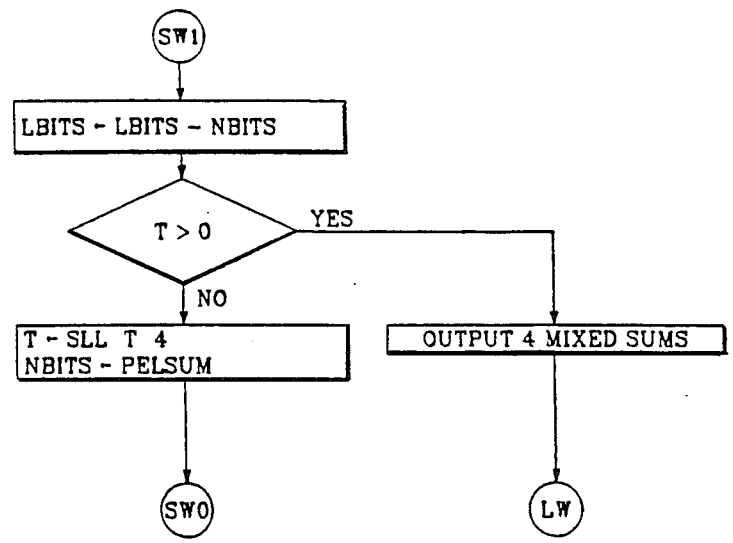
Fig. 20. Processing for short white runs with LBITS > NBITS

RUN TO SUM CONVERSION
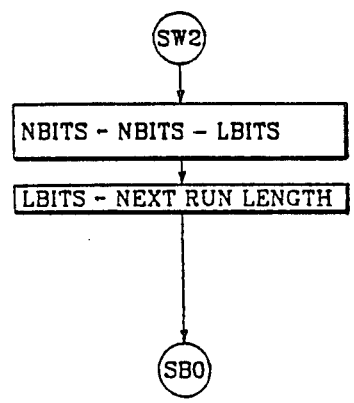
Fig. 21. Processing for short white runs with LBITS < NBITS

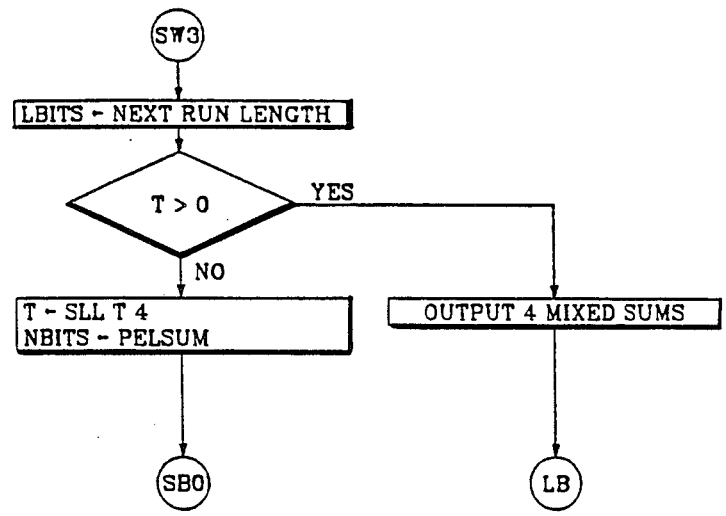
Fig. 22. Processing for short white runs with LBITS = NBITS

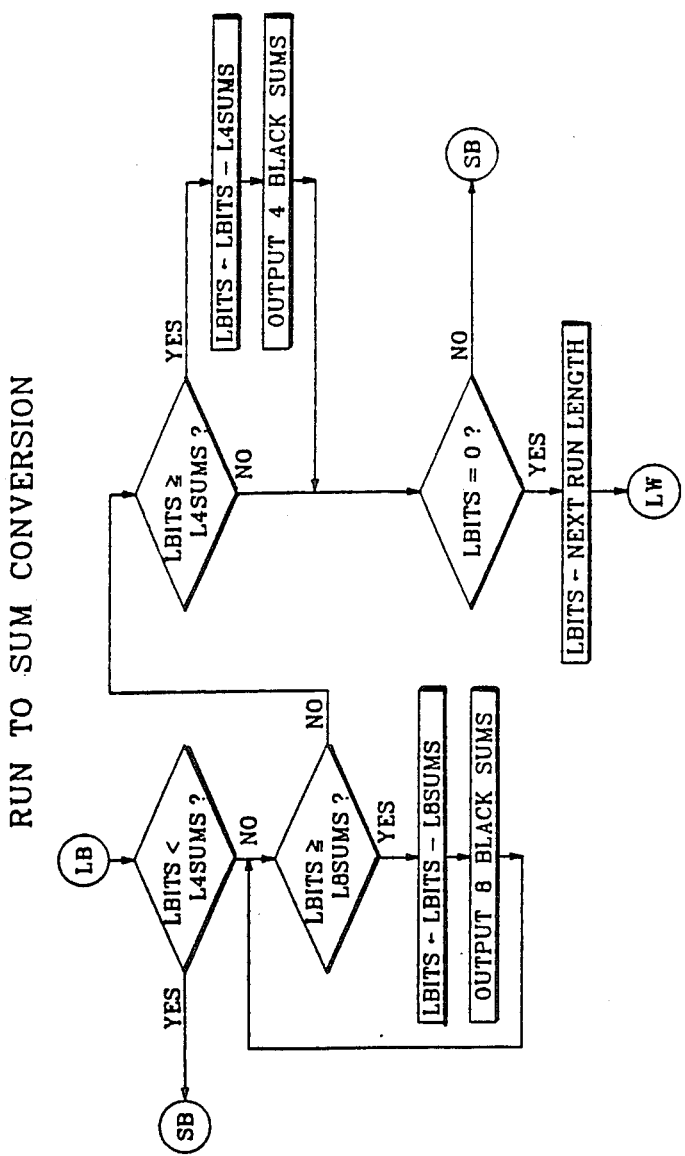
Fig. 23. Processing for long black runs.

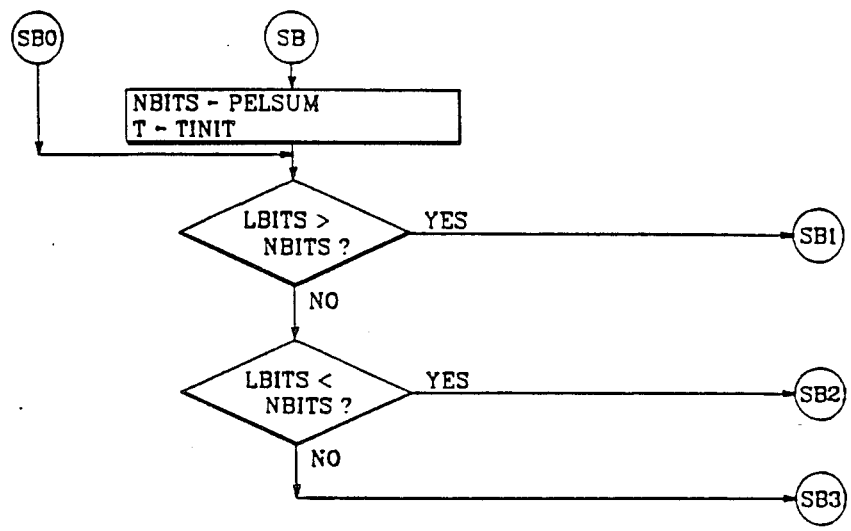
Fig. 24. Processing for short black runs.

RUN TO SUM CONVERSION
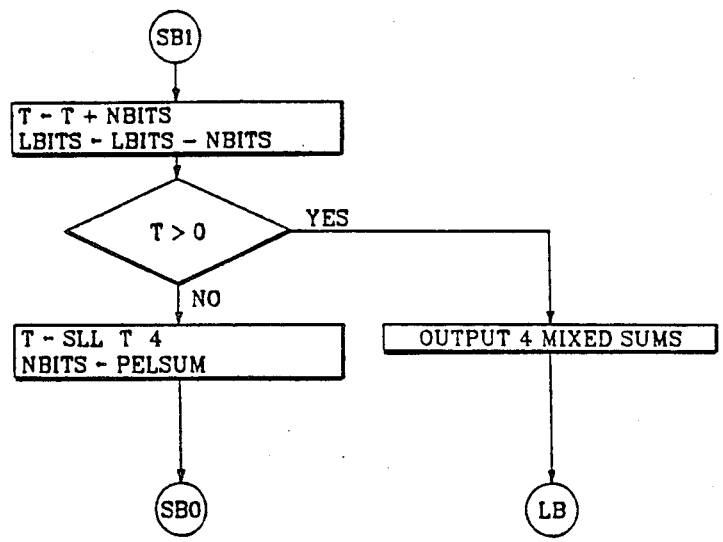
Fig. 25. Processing for short black runs with LBITS > NBITS RUN TO SUM CONVERSION
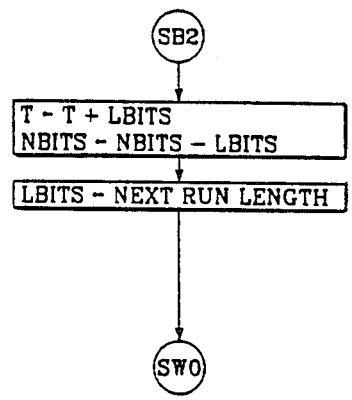
Fig. 26. Processing for short black runs with LBITS < NBITS RUN TO SUM CONVERSION
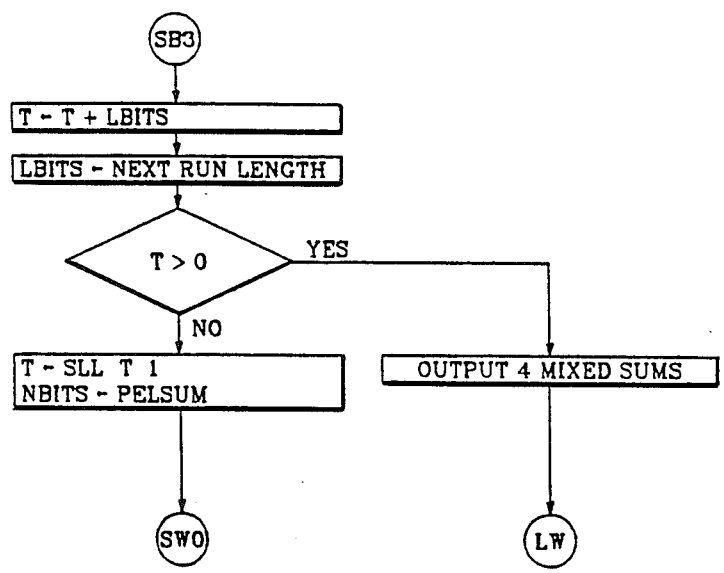
Fig. 27. Processing for short black runs with LBITS = NBITS RUN TO SUM CONVERSION
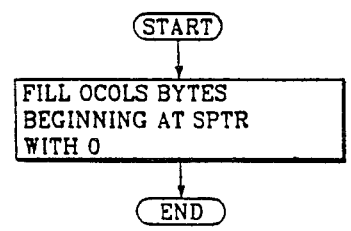
Fig. 28. Processing labelled "OUTPUT ALL-WHITE LINE" for first input line to contribute to an output line.

RUN TO SUM CONVERSION
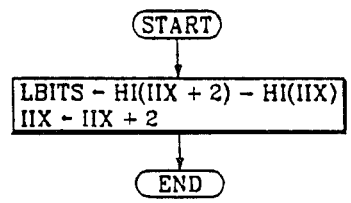
Fig. 29. Processing labelled
"LBITS ← NEXT RUN LENGTH"

RUN TO SUM CONVERSION
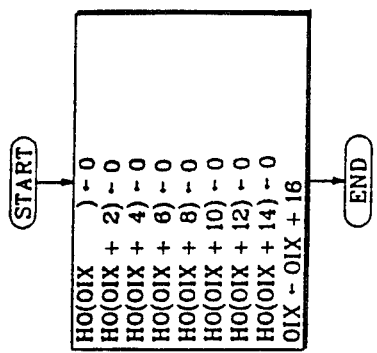
Fig. 30(a). Processing labelled "OUTPUT 32 WHITE SUMS" for first input line to contribute to an output line.
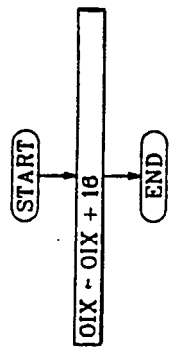
Fig. 30(b). Processing labelled "OUTPUT 32 WHITE SUMS" for subsequent input lines.

RUN TO SUM CONVERSION
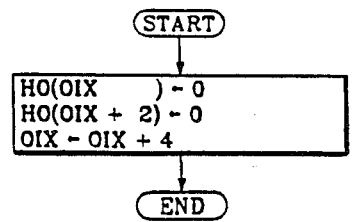
Fig. 31(a). Processing labelled "OUTPUT 8 WHITE SUMS" for first input line to contribute to an output line.
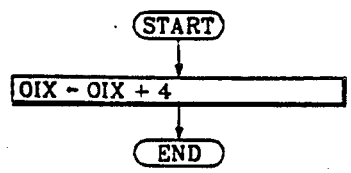
Fig. 31(b). Processing labelled "OUTPUT 8 WHITE SUMS" for subsequent input lines.

RUN TO SUM CONVERSION
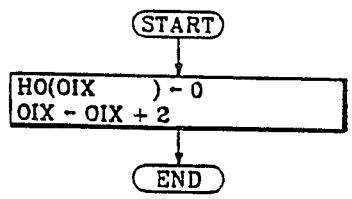
Fig. 32(a). Processing labelled "OUTPUT 4 WHITE SUMS" for first input line to contribute to an output line.
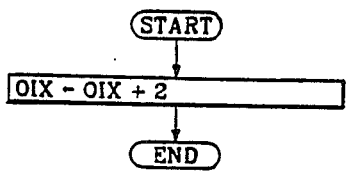
Fig. 32(b). Processing labelled "OUTPUT 4 WHITE SUMS" for subsequent input lines.

RUN TO SUM CONVERSION
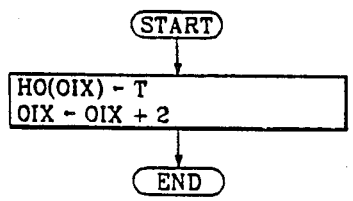
Fig. 33(a). Processing labelled "OUTPUT 4 MIXED SUMS" for first input line to contribute to an output line.
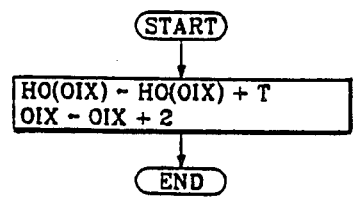
Fig. 33(b). Processing labelled "OUTPUT 4 MIXED SUMS" for subsequent input lines.

RUN TO SUM CONVERSION
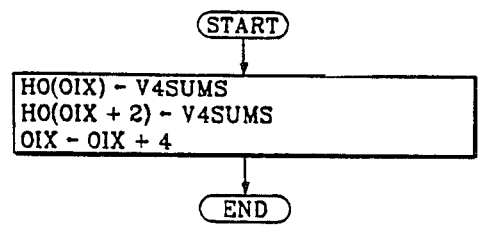
Fig. 34(a). Processing labelled "OUTPUT 8 BLACK SUMS" for first input line to contribute to an output line.
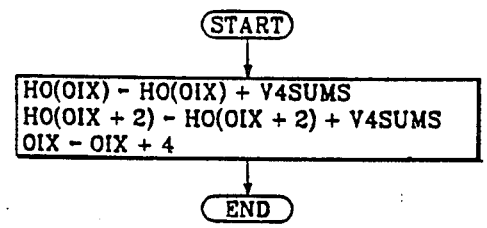
Fig. 34(b). Processing labelled "OUTPUT 8 BLACK SUMS" for subsequent input lines.

RUN TO SUM CONVERSION
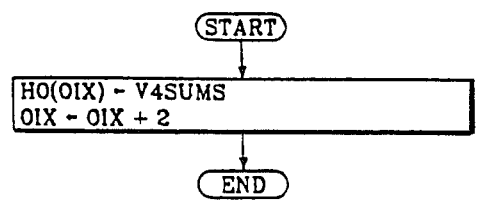
Fig. 35(a). Processing labelled "OUTPUT 4 BLACK SUMS" for first input line to contribute to an output line.
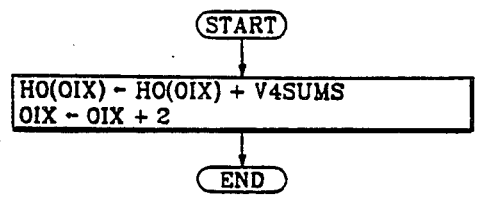
Fig. 35(b). Processing labelled "OUTPUT 4 BLACK SUMS" for subsequent input lines.

SOFT COPY DISPLAY OF FACSIMILE IMAGES

DESCRIPTION

1. Technical Field

The invention relates to improvements in the field of soft copy (video) display of facsimile generated images such as text and/or graphics.

2. Background Art

The increasing popularity of teleconferencing has led to a desire to provide for soft copy or video display of images of limited or no gray scale. In many cases the images will have originated as facsimile images, but as will become clear hereinafter the invention is applicable to any binary image, no matter how generated. Typically the originals may consist of textual material, either alone or in combination with other symbols or images which will be collectively hereinafter referred to as graphics.

For convenience the resulting soft copy or video display desirably complies with NTSC standards and the problems imposed by the use of these standards is the main problem to be overcome. More particularly, an NTSC screen has a 4:3 aspect ratio, and further dictates that the video may be displayed in about 480 vertically displaced parallel scanning lines. For example, 512 picture elements (or pixels) are horizontally displaced along each scanning line. On the other hand, the typical graphics image originates in a document which may be 8½×11 or 8½×13 or 8½×14. If we assume that the intelligence contained in the original covers about ten inches vertically, and if we provide a convenient translation between the original, represented by a facsimile signal, to our 480 scan line video, then two results follow. First, the 8½ inch width occupies only about half the screen, and secondly, the typewritten text, if any, is so small that it cannot be read.

One solution to the problem is to provide only hard copy, however, this requires that copies be made before a teleconference begins (limiting spontaneity) and other soft copy functions such as annotation and electronically controlled pointers are not available.

Another solution is to use two monitors, capture the top and bottom halves as two separate images, and use these two separate images to drive the two different monitors. This solution necessarily admits the possibility that the break (at the bottom of the first image and the top of the next image) may result in some information being split across the two displays, the solution also requires two independent displays and associated refresh buffers.

It is therefore an object of the invention to provide for soft copy display of such graphics images thus making available typical soft copy functions such as electronic annotation and pointing, and which also does not require advance preparation and thus supports spontaneity.

It is another object of the invention to meet the preceding object without unduly multiplying equipment, such as by requiring more than a single display and associated refresh buffer. It is a further object of the invention to meet the foregoing objects and, at the same time, allow efficient scrolling of the soft copy display so that any selected portion of the original can be displayed.

While the foregoing discussion suggests that an image (or document) be split into two (or more) segments separated along a horizontal, and scrolling can be accomplished vertically, this is a nonlimiting example. As will be described below, the document can also be split into two or more segments separated along a vertical line, and scrolling can be accomplished horizontally. Finally, the document can be split in segments separated along both the horizontal and vertical, and scrolling can be accomplished both horizontally and vertically.

The invention is also applicable to efficient soft copy display of one of multiple different images, such as for example wherein one of a plurality of images are to be displayed, each one of which can be readily, separately perceived on a soft copy (video) display. In this form, the invention provides for ready control of the particular image being displayed and allows the operator to scroll from one independent image to the next. If desired, for example, the operator can select a portion of one image and a portion of another image to be visible, simultaneously.

Although the problem outlined above (and its solution to be described below) relate to scrolling in the vertical direction, it should be understood that the invention can effect scrolling in the horizontal direction, in lieu of or in addition to scrolling in the vertical direction.

Digital facsimile standards are described by Hunter et al in "International Digital Facsimile Coding Standards", appearing in *The Proceedings of the IEEE*, Vol.68, No. 7, Jul. 1980 at pages 854–867. One facsimile machine now available on the market is the Scanmaster I which provides 1728 pels per line and a resolution of about 200 lines per inch (or about 2200 lines for an 11 inch document). This machine has a low resolution mode in which the vertical resolution is reduced to about 100 lines per inch (thus about 1100 lines for a nominal 11 inch document).

Facsimile data is generated by raster scanning of a document. Defining or selecting the vertical resolution defines the number of scan lines per inch, and when the document length is specified, the number of different lines of data generated in the scanning process. Defining the number of pels per line defines in effect the number of bits produced by the scanner for each scanning line. As indicated in the Hunter et al paper, 1728 pels per line is a typical value, and the Scanmaster I has selectable vertical resolution of 100 or 200 lines per inch. In order to minimize transmission time and/or storage costs, facsimile data is normally encoded or compressed in some fashion before it is transmitted or stored. These encoding techniques may vary from simple one-dimensional run length codes or variations thereof, to more complex two-dimensional codes which take account of relationships between a run end and a run end on a preceding scan line. As will be described hereinafter, the present invention is not affected by the particular format in which the facsimile data is received; in one embodiment to be described unencoded binary facsimile data is treated, and in another embodiment of the invention the compressed data run length is decoded into the respective ends of the sequential runs.

In one aspect the invention obtains an advantage by the novel use of an image buffer. Such buffers are typically a byte (or eight bits) deep although the invention can be applied to buffers of different (greater or lesser) depth. We have found that effective images can be created with less than eight bits (down to and including a single bit). By suitable controls we can load an image (or image segment) into a group of bit planes (less than all of the buffer bit planes), thus leaving other bit planes to form at least one other group within which we load another image (or image segment). So long as we provide suitable control signals we can arrange the display to read selectively from one or the other group of bit planes to display either image (or image segment). In fact, the appropriate control signals themselves can be stored in still another bit plane or bit plane group of the buffer (although that is not essential to the invention). Once we have the different images (or image segments) loaded into the buffer, the operator can not only select which image (or image segment) to display but the operator can also scroll between the images (or image segments).

Typically, in converting from facsimile (or other binary or two tone) image to a video image which is capable of displaying intermediate gray scale, we must contend with the lower resolution capability of the video format. This requires a translation from two tone image (no gray scale) and relatively high resolution to lower resolution but with gray scale ability. One example of such a translation is Schaphorst U.S. Pat. No. 4,387,395. Another feature of the invention is a particularly efficient and powerful translation.

Basically, the problem is to represent an N bit two tone image in K bytes where $N>K$ or $N>>K$. It is sometimes important to effect the representation where the ratio N/K is irrational, e.g. not an integer. In accordance with the invention a table is constructed having a numerical value for the effect on the video image of transitions in the two tone image, as a function of the position of the transition in the two tone image. The table can be constructed on the assumption that the transition, whose effect is being computed is the only transition in the two tone image. An output buffer (which will contain the video image at the conclusion of processing) is initialized to a state representing one of the two tones. Since white predominates in most two tone images the output buffer is initialized to represent this tone. The actual two tone image to be translated (the digital representation) is loaded into an input buffer. The image is examined for the first white/black transition and the location of the transition is determined. The table is accessed on the basis of that location to extract the corresponding numerical value. That value is summed with the contents of the input buffer. Since the initial transition is white/black and the output buffer was initialized to represent white, the summation is effected on the basis that the sign of the extracted numerical value is opposite the sign of the output buffer. If there are no other transitions, the process has completed. If there is another transition it is necessarily black/white, and its effect is opposite the effect of the white/black transition. Therefore, when the next transition (black/white) is examined we perform the summation on the basis of like signs. For each succeeding transition we continue to alternate the sign relationship (opposite, same, opposite, same, etc.). It should be apparent that the result represents, in the video image, the nature of the original two tone image. One advantage of the technique is that it can be applied to a two tone image representation whether it is in raw binary form or run end coded, since we are merely examining the locations of the transitions which is what is represented in the run end format. A further advantage is that the technique eliminates time consuming operations like multiplication and division. The technique is further improved with the following technique.

Rather than constructing a table with entries for every possible transition location in the image, we use some convenient unit, in one embodiment 13 pels (since, in one embodiment we are translating in the ratio of 13 two tone image pels to four video bytes). Thus the table has 14 numerical values. If we locate a transition which is more than 13 pels from the prior transition we use a constant (4 byte value) for every such group of 13 pels without a transition. By the modulo 13 arithmetic we achieve the effect of a division by 13 in which only an integer I (the number of 13 pel groups without a transition) and a remainder r (the last, less than 13 pel group to the transition) is significant. The remainder r is the address into the table.

Thus the invention provides a method of translating a two tone image to a gray scale video image comprising the steps of:
 (a) providing a table representing numerical values for the effect of transitions in said two tone image on said video image,
 (b) loading an input buffer with a representation of said two tone image,
 (c) initializing an output buffer with a numerical value to represent a gray scale image consisting of only one of said tones,
 (d) examining said input buffer to locate a transition therein and determining the location of the transition,
 (e) extracting, from said table, a numerical value corresponding to the location of said transition,
 (f) summing said value, using alternating signs for said value on alternate summations, with the contents of said output buffer,
 (g) and repeating in sequence steps (d), (e) and (f) until each transition in said input buffer is processed.

The invention also provides a method of displaying an operator selected portion of an image, on a display with inadequate area to perceivably display the entire image simultaneously, comprising the steps of:
 (a) dividing the image into at least first and second segments,
 (b) storing a representation of the first segment in a multi-bit plane buffer using a first group of said bit planes comprising less than all of the bit planes in said buffer,
 (c) storing a representation of the second segment in the multi-bit plane buffer using a second, distinct group of said bit planes,
 (d) displaying the operator selected portion by selecting, for each pixel, information either from the first or second group of bit planes.

Furthermore, the invention provides a method of displaying an operator selected image from a plurality of images, on a display with inadequate area to perceivably display all the images simultaneously, comprising the steps of:
 (a) storing a representation of one image in a multi-bit plane buffer using a first group of said bit planes comprising less than all of the bit planes in said buffer,
 (b) storing a representation of another image in the multi-bit plane buffer using a second, distinct, group of said bit planes,
 (c) selecting an image for display by driving a display with information either from the first or the second group of said bit planes.

BRIEF DESCRIPTION OF THE DRAWINGS

The present invention will now be described in the following portions of the specification when taken in conjunction with the attached drawings in which like reference characters identify corresponding apparatus and in which:

FIG. 11 illustrates the contents of a table which is employed during processing input pels to produce output pixels, FIG. 12 represents a typical fax document or image in terms of the pels by which it is represented, FIG. 13 shows a detail of the address register 70, FIGS. 14A-14D are useful in explaining horizontal scrolling, and FIGS. 15A-15D are useful in explaining scrolling in arbitrary directions.

FIG. 16 is a flow diagram illustrating the processing for converting runs to sums of pels in accordance with a further embodiment of the invention.

FIG. 17 is a flow diagram illustrating the initializations to convert a line of runs to sums in accordance with the further embodiment.

FIGS. 18 and 19 are flow diagrams illustrating the processing for long white runs and short white runs, resp.

FIG. 20 is a flow diagram illustrating the processing for short white runs with LBITS>NBITS.

FIG. 21 is a flow diagram illustrating the processing for short white runs with LBITS<NBITS.

FIG. 22 is a flow diagram illustrating the processing for short white runs with LBITS=NBITS.

FIG. 23 is a flow diagram illustrating the processing for long black runs.

FIG. 24 is a flow diagram illustrating the processing for short black runs.

FIG. 25 is a flow diagram illustrating the processing for short black runs with LBITS>NBITS.

FIG. 26 is a flow diagram illustrating the processing for short black runs with LBITS<NBITS.

FIG. 27 is a flow diagram illustrating the processing for short black runs with LBITS=NBITS.

FIGS. 28 through 35 further diagrams illustrating other processing steps in accordance with the present invention.

DETAILED DESCRIPTION OF PREFERRED EMBODIMENTS

Figure 1:
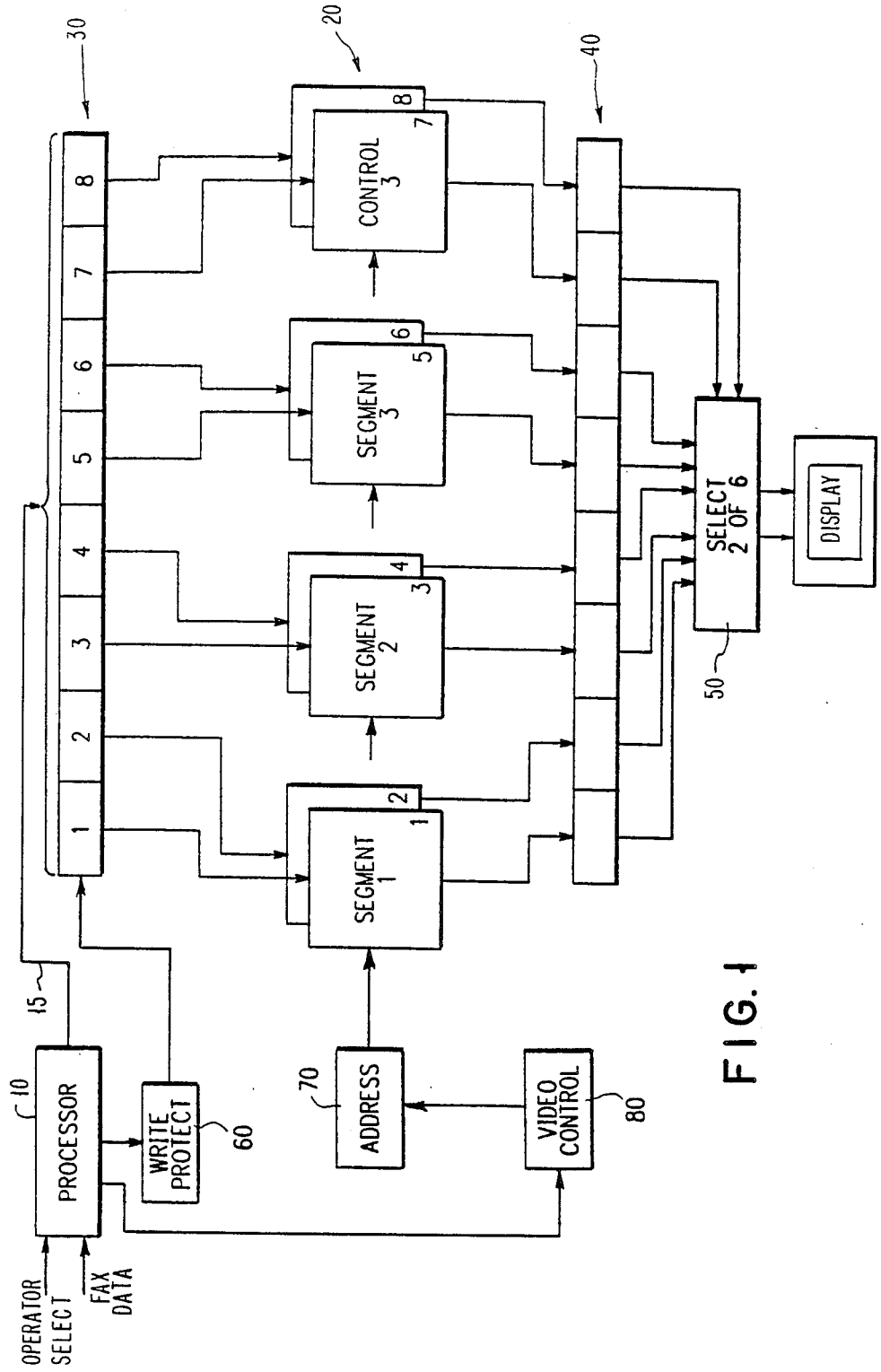
FIG. 1 is a block diagram of one embodiment of the invention.
Figure 2:
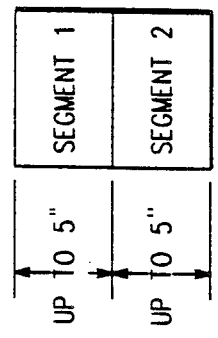
FIGS. 2 and 3 illustrate how a single document may be segmented for storage using the apparatus of FIG. 1.

FIG. 1 is a block diagram of one embodiment of the invention which is applicable regardless of the form of the facsimile data. As shown in FIG. 1 a processor (such as an IBM Series 1 or a Motorola 68000) receives the binary facsimile data (FAX DATA). The data after processing (which will be described below) is stored in a buffer memory 20. The buffer memory may be a Grinnell GMR 270 or Imaging Technology FB512 or the like. As shown in FIG. 1, the buffer memory is one byte deep (e.g. it includes eight bit planes, the planes numbered 1-8 in FIG. 1). The depth of buffer memory 20 is exemplary, and it will be apparent that the depth may be increased or decreased. The buffer 20 is configured to store 512 ×512 pixels, e.g. if considered as a matrix, it has 512 rows and 512 columns, in each of eight planes. For each different row/column position of each plane, one bit can be stored. An important characteristic of the invention is our finding that fax originated data, even after conversion for video display need only use 1-3 bits per pixel (preferably 2-3). Accordingly, a 1-byte deep buffer can be arranged to store different images or image segments in different groups of bit planes, where each group of bit planes includes less than all the bit planes, preferably 1-4 planes. In the embodiment of FIG. 1, three different segments of a document are treated (FIG. 2 shows one possible relationship between the different segments making up the document). A first segment is stored in bit planes 1 and 2, a second segment is stored in bit planes 3 and 4, and a third segment is stored in bit planes 5 and 6. This leaves bit planes 7 and 8 free of image data and, as will be described, control data is stored in bit planes 7 and 8.

As the binary facsimile data is received and processed in the processor 10, the processor 10 outputs the data on a bus 15 to a write register 30. In the case of unencoded fax data the processor 10 is merely required to properly address the buffer. In the case of compressed data the processor 10 must also effect a decode-like function in addition to proper addressing. In prior art machines fax data would simply be written into the buffer 20 at relatively increasing locations in the memory from some datum. In accordance with the invention this is altered as is now described. The processor 10 may control a write protect register 60 so that, at any instant of time, only two of the eight bit positions in the write register 30 are operative. As segment 1 data is processed and output on the bus 15, the address register 70 steps through the address space of the buffer 20 in sequential order. At any address (specific row/column) the two bits in bit positions 1 and 2 of the register 30 are written to bit planes 1 and 2, respectively. As fax data is received and processed by processor 10, placed on the bus 15, the address register 70 changes state so that bit planes 1 and 2 (or a specific region in these planes) are eventually filled with data representing segment 1 of the document (see FIG. 2).

However, this only partially provides data representing the document since the document also includes segments 2 and 3. More particularly, as the fax data continues to be received, after segment 1 has been completed, segment 2 is begun. At this time, processor 10 continues placing the data on the bus 15, but two changes are made. One change is to the write protect register 60 and the other change is to the address register 70. The write protect register 60 is altered so that bit positions 1 and 2 can no longer be written to bit planes 1 and 2, but now bit positions 3 and 4 of the register 30 can be written to bit planes 3 and 4, respectively. Furthermore, the address register 70 is recycled to readdress the buffer 20 from beginning to end. As a result, fax data representing segment 2, processed by the processor 10, is placed on the bus 15 and written, via bit positions 3 and 4 of the register 30, to bit planes 3 and 4. In this fashion, data representing the segment 2 is stored in the bit planes 3 and 4.

As fax data (now representing segment 3) continues to be received and processed by processor 10, it is again placed on the bus 15. However, as before, changes are made to the status of the write protect register 60 and address register 70. Particularly, bit positions 5 and 6 are now enabled so that data provided on the bus 15 can write bit planes 5 and 6, respectively. The address register 70 is recycled to begin writing buffer 20 again. In this fashion, data representing segment 3 is, after processing, stored in bit planes 5 and 6.

At the completion of this operation, fax data representing up to 15 inches of the document has been stored in three segments, a first segment, two bits wide (four levels) is written in bit planes 1 and 2, two bits representing segment 2 (again four levels) is written in bit planes 3 and 4 and segment 3 is represented by the two bits of bit planes 5 and 6. It should be apparent that the data transferred by bus 15 (nominally eight bits wide) has only two bits of significance. Rather than changing the conductors of the bus 15 which are driven as the different segments of buffer 20 are written, the processor 10 can output the identical bit pair over the four conductor pairs in bus 15. Thus the write protect register 60 can select which buffer segment is written at any instant.

While processor 10 has direct control of write protect register 60, access to the address register 70 is via the video control 80. The video control 80 is associated with creation of the display (described below) by reading buffer memory 20 at a constant rate. The particular address space of buffer memory 20 which is read can be controlled by processor 10 by passing an offset to video control 80. This offset will displace the address space read as the display is refreshed.

Assuming now that the operator desires to display segment 2, that desire may be manifested to the processor 10 by any suitable device such as a cursor, light pen, keyboard, etc. In response to that desire, processor 10 may write in every bit position in the bit planes 7 and 8 (via the data bus 15, write register 30 and write protect register 60 enabling bit positions 7 and 8) a bit combination so as to select bit planes 3 and 4 (storing segment 2) of the buffer 20. Assuming the operator desired that the top of segment 2 of the document appear at the top of the display, the address register 70 is set to the beginning of the buffer 20, and the address register 70 is counted by a clock via video control 80. As the address register 70 counts, the contents of the buffer 20 are placed into the read register 40. The read register 40 has a bit position for each bit plane. As shown in FIG. 1, an output from bit positions 7 and 8, of the read register 40 control the select 2 out of 6 circuit 50. The select 2 out of 6 circuit 50, when controlled by the bits from the bit planes 7 and 8 (using a control bit pattern 10—represented segment 2, for example) enable the information from segment 2 (bit planes 3 and 4) only to pass the select 2 out of 6 circuit 50. As a result, data representing only segment 2, is provided to the display. The select 2 out of 6 circuit can merely be a gating combination. Alternatively a lookup table, addressed by the output of buffer 20 can be used.

In a similar fashion of course the operator can select the display of segment 1 or 3.

Actually since writing to buffer 20 occurs during reading of the buffer 20 we have used the following procedure, which is a slight variation on that described above. When writing segment 1 we control the write protect register 60 to enable bits 1, 2, 7 and 8. At the same time as we write segment 1 (in bit planes 1 and 2) we write the segment 1 control bits 01 into bit planes 7 and 8, respectively. As a result an observer can see segment 1 as it is written to memory. Bits 7 and 8 can be calculated by processor 10 and written to write register for each memory location, or alternatively a register in the processor 10 can be set aside for this purpose, loaded with the desired control bits (01, for example) and the register contents used to write into bits 7 and 8 of the write register 30.

In addition, however, the operator can select, as the top line for the display any line in the document (anywhere in segments 1-3). Based on that selection, the processor 10 appropriately loads register 70 (via video control 80) and writes control bits to bit planes 7 and 8 so that the top line on the display will be the line selected by the operator, and the rest of the display will contain the contiguous following lines (down to the bottom of the display) regardless of segment boundaries.

Based on the operator selected top line, the processor 10 determines the corresponding address in the buffer 20 and employs that as the initial contents of the address register 70. Control bits (for that line) are written in the bit planes 7 and 8. These bits merely define the bit plane group storing the image segment which contains the desired line. The processor 10 then calculates which succeeding lines (throughout the remainder of the segment within which the top line lies) and identical control bits are written in bit planes 7 and 8 identifying the segment. Unless the operator has selected one of the top lines for the display to correspond to the top line of any of segments 1, 2 and 3, the portion of the selected segment below the selected top line will not entirely fill the display. The processor 10 then computes the number of lines in the next segment (in segment 2 if segment 1 had been selected, segment 3 if segment 2 had been selected) necessary to fill to the bottom of the display. Corresponding control bits are then written into bit planes 7 and 8 at addresses covering the area computed by processor 10 as necessary to fill to the bottom of the display. Once the bit planes 7 and 8 are written, the display will illustrate the selected portion of the document. The address register 70 is controlled (by video control 80) so that it rolls over from the terminal count (corresponding to the end of the buffer 20) back to the initial position in the buffer 20. Accordingly, if the operator selected line 21 (see FIG. 2) to be the top line on the display, then the display would illustrate that portion of the document lying between the lines 21, 31, a distance which corresponds to the vertical dimension on the display. If the operator had selected the desired top line to be within the last segment of a document, then the following portions of the segment will generally be inadequate to fill the display. We cannot treat segment 3 like any other segment, i.e. wrap it back to the "next" segment, since there is no "next" segment. While it could be wrapped back to segment 1, we have found it preferable to blank the "empty" part of the display. We can write a non-existent control bit combination (00) to our control bit planes to achieve this result.

Figure 9:
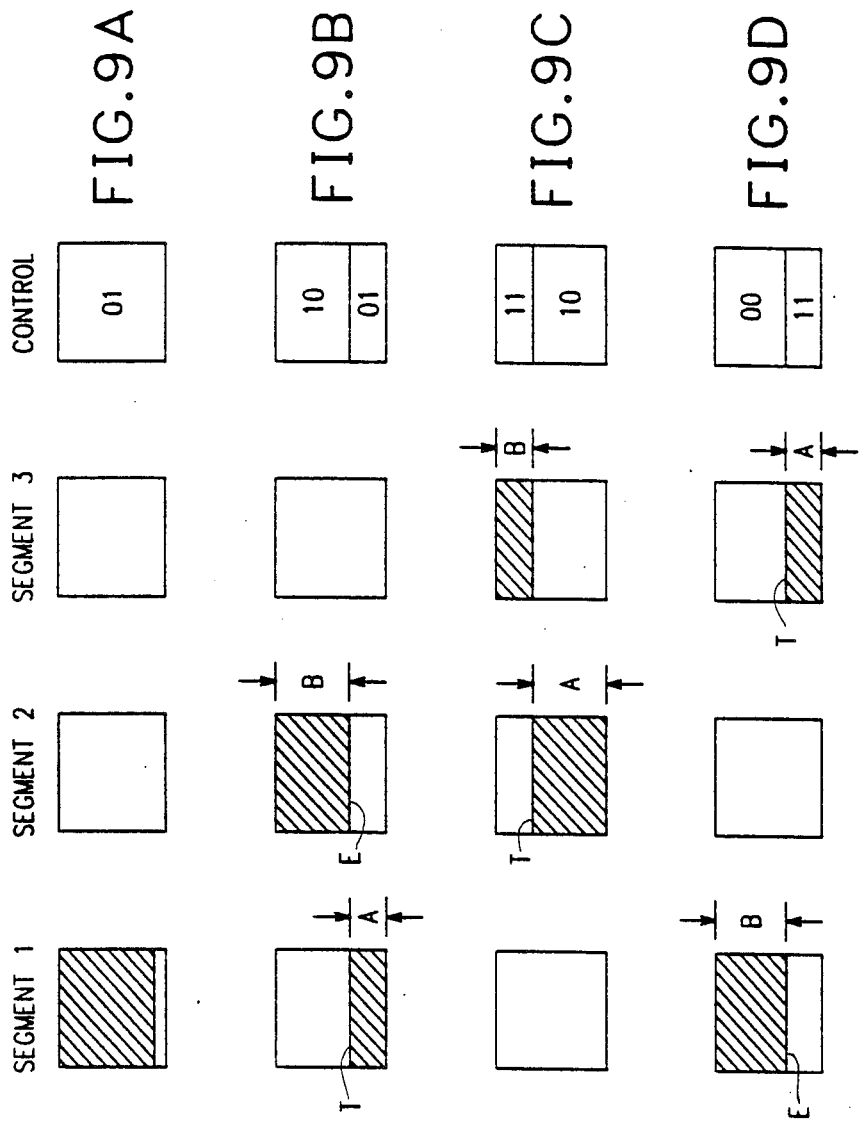
FIGS. 9A-9D illustrate four different cases for displaying a segment or combinations of segments and the corresponding control bits used to effect that display.

The foregoing is illustrated in FIGS. 9A-9D. The four groups of bit planes of FIG. 1 (group 1 is bit planes 1 and 2, group 2 is bit planes 3 and 4, group 3 is bit planes 5 and 6 and the fourth group is the control group, bit planes 7 and 8) are shown in FIG. 9A designated Segment 1, Segment 2, Segment 3 and Control. The cross-hatched area shows a source of data to write the video display, and the designation "01" in the control group indicates that each address stores the bit combination 01 identifying segment 1 or group 1. Since the video display can only show 480 lines (approximately), and we have assumed that segment 1 stores 512 lines, then the video display shows the cross-hatched region which occupies most of segment 1. Segments 2 and 3 store data defining other segments of the image, but because of the contents of the control group of bit planes, the data in segments 2 and 3 is not employed.

FIG. 9B shows a situation in which the operator manifests a desire to have line T (in segment 1) be the top line of the display. The processor 10 writes the control group of bit planes with the bit combination shown in FIG. 9B. More particularly, when the operator selected the top line T the processor writes the 01 (for segment 1) control bits in the control segment at an address corresponding to line T, and the same control bit combination is written for every other succeeding line in the segment 1. On the other hand, the remaining portion of the control group of bit planes has written therein the bit combination 10, selecting segment 2. Thus as shown in FIG. 9B, the display illustrating the cross-hatched regions shows the lower portion of segment 1 and the upper portion of segment 2. As shown in FIG. 9B of course the sum of A and B is 480 lines.

As we have said the display is continually being refreshed as the processor 10 writes to the buffer 20. Since buffer 20 is 512 video lines long, but the display actually only "sees" 480 video lines, we can write 32 lines of control bits without actually altering the display seen by the operator. Thus, when altering the display in response to an operator request, we can write up to 32 lines of control bits to buffer 20, then adjust the offset to register 70, write a further 32 lines and again adjust the offset, and reiterate the procedure until the entire screen is rewritten. The operator sees his desired segment progressively move up (or down) across the screen until it reaches the desired position. However, the rate at which this is implemented need not be the maximum the machine is capable of. Rather, we can let the operator select the rate, by entering a number at a keyboard or positioning a joystick, etc.

FIG. 9C shows a situation wherein the operator selected top line T lies in segment 2. Thus, from line T to the end of the buffer the control group has written therein the designation, 10, selecting segment 2. On the other hand, the remaining portion of the control group bit planes have the designation 11 written therein, to select segment 3.

Finally, FIG. 9D shows a situation wherein the operator selected top line T lies in segment 3. The only difference in the data stored in the control group of the bit planes is that from Line T to the end of buffer 20 the designation is 11, selecting segment 3, and everywhere else the designation is 00, selecting a blank field. As previously indicated, on actually reading out buffer 20 (after the control bits are written) the address register starts at an address corresponding to the operator selected line T so the display shows the segment portion correctly vertically aligned.

Figure 3:
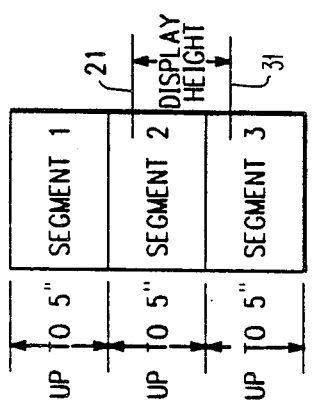
Figure 4:
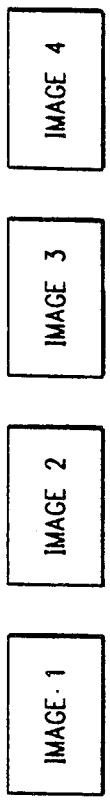
FIG. 4 illustrates how a plurality of different images, rather than segments of a single image, can be stored employing the apparatus of the invention, FIGS. 5 and 6 identify a correlation between the input facsimile pels and output TV pixels in the low resolution (FIG. 5) and high resolution (FIG. 6) modes of operation.
Figure 8:
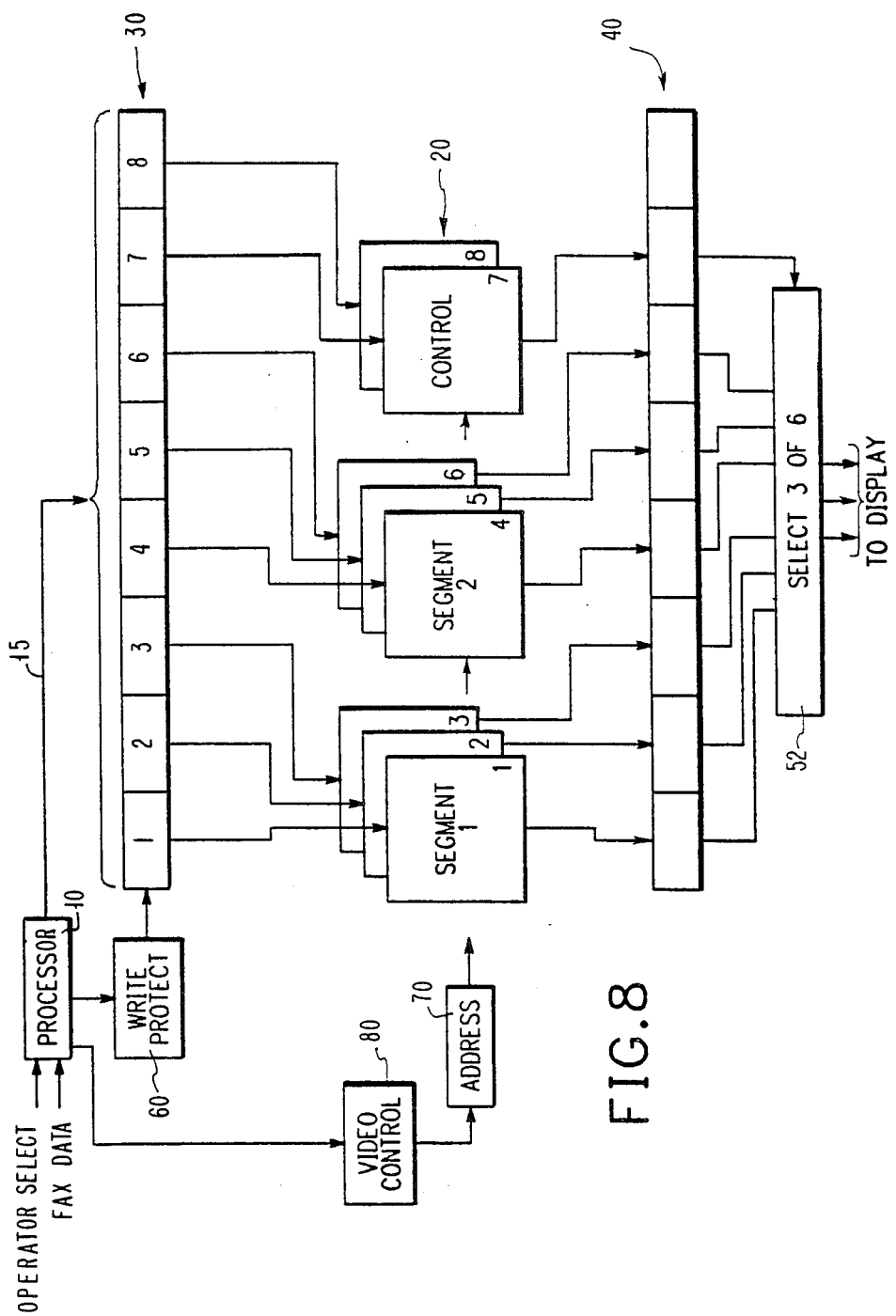

FIG. 1 shows an embodiment of the invention in which the buffer memory 20 is divided into four groups of bit planes, two bit planes in each group, wherein the contents of three of the groups correspond to three different segments of a document or image (as shown in FIG. 2). That particular grouping is not essential to the invention and instead a particular document or image can be broken up into two segments, as is shown in FIG. 3. Corresponding hardware is shown in FIG. 8 wherein buffer memory 20 is broken up into three groups of bit planes, the first and second groups including three bit planes each and the third group including the remaining bit planes. For the embodiment of FIG. 8 of course only a single control bit plane is needed to select between the first or second groups of bit planes. Thus, FIG. 1's 2 of 6 circuit 50 has been replaced, in FIG. 8, with a 3 of 6 circuit 52.

It should be apparent to those skilled in the art that the invention does not require the different groups of the buffer 20 to be dedicated to different segments of a single document or image. Rather, the apparatus of FIG. 1 can also be employed to store and display three different images, rather than segments of a single image. Likewise, the apparatus of FIG. 8 can be used to store and display two different images. In both cases the display will show any 480 line region of an image or portions of different images.

Figure 7:
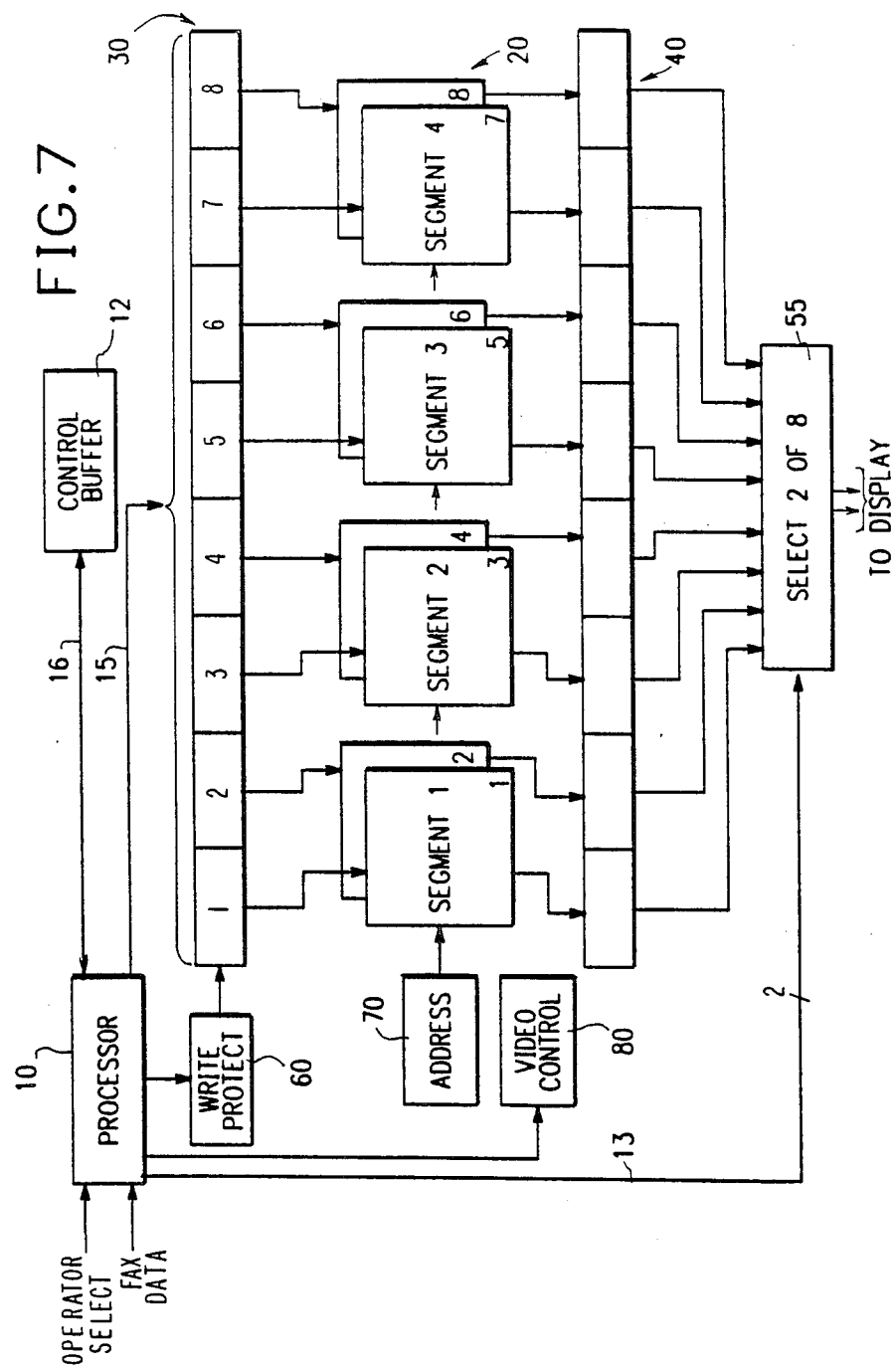
FIGS. 7 and 8 are block diagrams of alternate embodiments of the invention.

Dividing the buffer 20 into four groups of bit planes (as is shown in FIG. 1) can also be used to store four different segments of a given image or document, or signals representing four different images or documents. Hardware to effect this operation is shown in FIG. 7. FIG. 7 differs from FIG. 1 in that the select 2 out of 6 circuit 50 has been deleted and its place taken by a 2 out of 8 circuit 55. Thus, the eight bits of the read register 40 provide eight inputs for the select 2 out of 8 circuit 55, and a 2-bit bus 13 from the processor 10 provides control input to select one of the four different groups of bit planes. The control information of course cannot be written into the buffer 20, but instead is written into a control buffer 12. Thus the contents of control buffer 12 are read out in synchronism with the reading of the buffer 20 to control the 2 out of 8 select circuit 55. The control buffer 12 thus has two bits for every bit position in any bit plane. Alternatively, a lookup table could be used which is loaded from a selection of four sources to select one of the four segments. An example of such a control buffer is the graphics overlay bit planes in a Grinnell GMR 270.

A typical soft copy (video) image includes 480 active lines out of the 525 which are theoretically available in the NTSC standard. Each of these 480 scanning lines includes 512 pixels. If we are working with an 11 inch document, then the facsimile data could include 1728 pels per scanning line and about 1100 or 2200 scanning lines. Obviously, some type of conversion is required between the facsimile pels and the video pixels.

In one embodiment, every three pels produces a video pixel. Since we are limited to 512 pixels per line, we only use 1536 (512×3) pels. In the high resolution case, two lines of 1536 pels each produce a single line of 512 pixels.

Thus for the low resolution case we count off and discard the first and last 96 pels on each line. We then take the remaining pels in groups of three, each group of three pels gives us a single video pixel in accordance with the following conversion:

Three white pels are replaced by C0,
Two white pels are replaced by 80,
One white pel is replaced by 40, and All black pels are replaced by 00.

Of course our universe of 0–3 white pels can be uniquely represented in two bits. The video display represents grey scale in hexadecimal notation and if we attempted to illustrate our universe of pels in two bits we would be losing much of the grey scale of the display. Therefore we distribute our universe of four states by the thresholding operation as represented immediately above.

For the high resolution case, after discarding the first and last 96 pels per line, we look at corresponding 3-pel groups in a pair of adjacent lines and produce a single video pixel in accordance with the following conversion:

Six white pels produce C0,
Five white pels produce A0,
Four white pels produce 80,
Three white pels produce 60,
Two white pels produce 40,
One white pel produces 20, and
All black pels produce 00.

Thus the low resolution case is implemented by a linear 3:1 mapping whereas the high resolution case uses a linear 6:1 mapping.

Implementing is effected (see FIG. 10 which shows apparatus internal to the processor 10) by first recognizing that six pels produce two pixels. Thus we provide a 6-bit pel register 112. Secondly, since white predominates (black is the exception), we provide a 2-pixel output register 120 which is originally filled with an all white level indication. We provide a table 160 from which to modify the output register 120 based on the number of black pels. The table 160 is used by identifying the position of the first black pel in the 6-bit pel register 112. Based on that position we then modify the contents of the pixel register 120 (on the assumption that the white/black transition is the beginning of a black run that goes to the end of the pel register 110). If in fact the run does not (that is, we find a succeeding black/white transition) we then again modify the pixel register 120 using the same table 160. The table is shown in FIG. 11. The column headed "First Black Bit" is the bit position of the first black bit appearing in the pel register 110 (where the bit positions are numbered 0–5 from left to right). The next six columns identify the assumed states based on the presence of the first black bit. The next two columns indicate our assumed state for the first and second pixels (A and B). Thus if the first black bit is in the 0 bit position, we assume that both pixels will be all black, e.g. three black bits corresponding to each pixel. The next two columns indicate the output states for the low resolution case (hex). The last two columns indicate the output states (hex) for the high resolution case. It should be noted that the table contents for the high resolution case is merely half of the corresponding values for the low resolution case.

The processing is now described; to save space we alter our notation as follows. Since we will be dealing with two pixel units and since our values are (in hexadecimal) 00, 20, 40, 60, 80, A0 or C0, we use only the significant digit. Therefore, in the following, CC actually represents C0 C0, etc. The two pixels in the output register 120 are set to white (CC). We then locate the first black pel in the pel register 112 and note its bit position. We index into the table 160 and depending whether we are low resolution or high resolution extract the appropriate modification quantity found in the table. We subtract the modification quantity from the contents of the pixel register. If we find that our assumption is incorrect, we go back into the table 160 with the position of the next transition (black/white) and cancel our modification for the white effect. This is effected by extracting a modification quantity from the table based on the position of the black/white transition and adding the modification quantity to the contents of the pixel register. This process is repeated until we have taken care of each transition in the buffer. For each transition we modify the contents of the pixel register, subtracting for white/black transitions and adding for black/white transitions.

To illustrate, assume that the six bits in the pel register 112 are 001110, e.g. the black bits are in positions 2, 3 and 4. Since there is a black pel in bit position 2, for the low resolution case we subtract 4C from the initial condition of the pixel register 120 (CC). However, we also note there is a black/white transition in bit position 5. Thus we go back into the table 160 and add 04 to the pixel register 120. This produces the result 84, corresponding to the 001110 pel register contents.

Because the table 160 has both high resolution and low resolution data, and since the high resolution effect is exactly one-half of the low resolution effect, we can "add" in the effect of two adjacent lines or merge lines.

This operation produces the possible resulting states 0, 2, 4, 6, 8, A and C. When we have three bits per pixel (three bit planes per group), these are each allowed states. When we have two bits per pixel (two bit plane groups), we only have four allowed states, 0, 6, A and C. Thus in the latter case the result of the pixel register is re-thresholded by equating states 4 and 2 to state 0 and state 8 to state 6, leaving A and C. For flicker suppression purposes we may remap selected white or near white pixels as described in commonly-assigned copending application Ser. No. 589,603, filed Mar. 14, 1984, entitled "Technique for Suppression of Flicker in Interlaced Video Images".

In another embodiment of the invention we actually employ the center 1664 pels per line, leaving 32 pels on each side which are ignored. See FIG. 12 which shows a typical document. At the top of the figure we show that the document is 1728 pels wide but we use only the center 1664 pels, converting these into 512 pixels. The document may be 1100 (low resolution) or 2200 fax lines (high resolution) in length.

Figure 5:
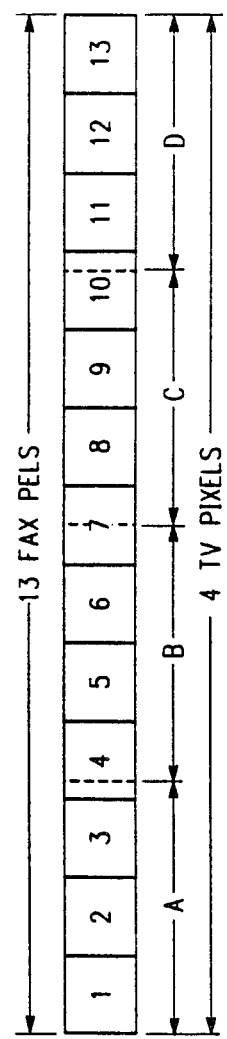
Figure 6:
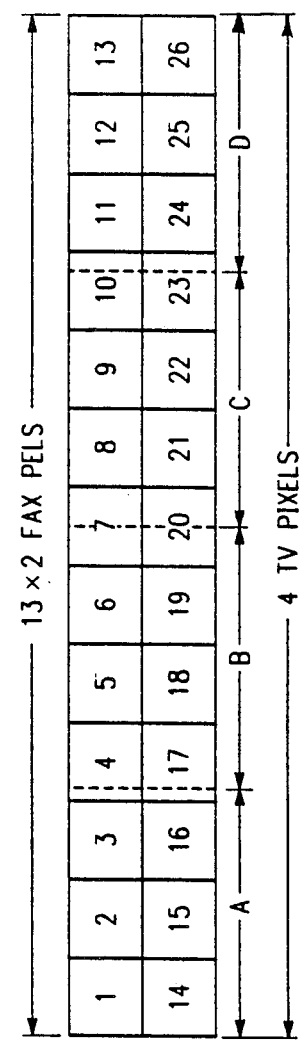

Thus we require a 13/4 conversion, that is for every 13 pels we produce 4 pixels. For low resolution data (100 lines per inch) we produce a pixel line for every pel line, but for high resolution data (200 lines per inch) we merge two pel lines into a single pixel line. These conversions are shown in FIGS. 5 and 6. For the low resolution case (FIG. 5) an arbitrary sequence of 13 fax pels (low resolution) are used to produce 4 TV pixels (FIG. 5), on the other hand, for the high resolution case an arbitrary horizontal slice 13 pels wide, 2 pels high, is used to produce 4 video pixels (FIG. 6).

Figure 10:
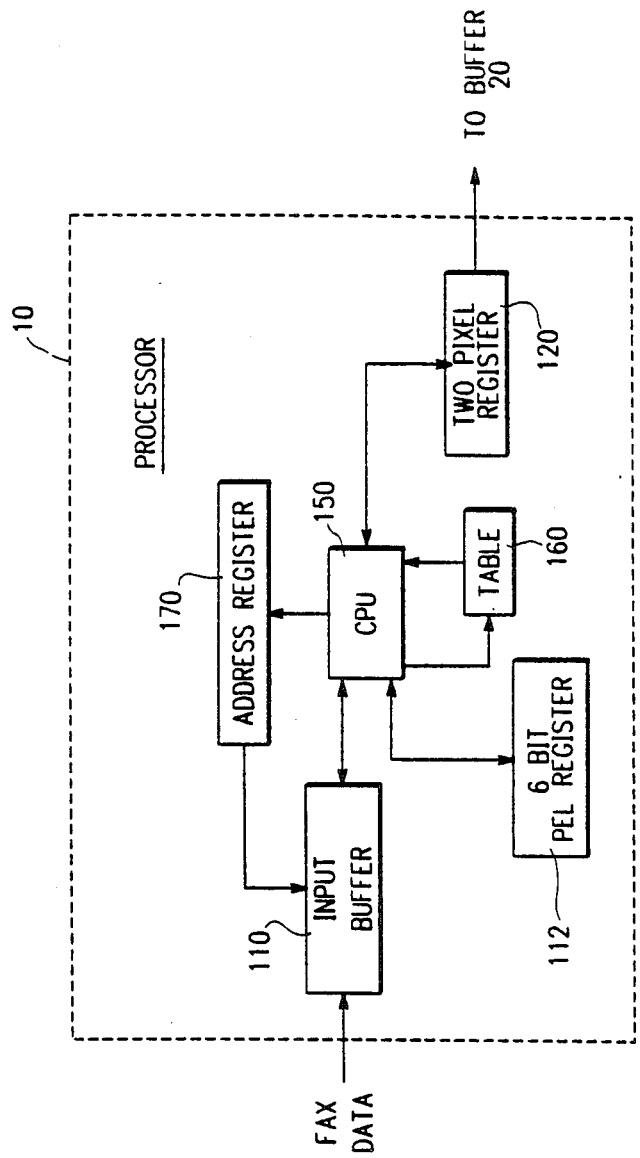
FIG. 10 is a detail block diagram of one element of the block diagrams of FIGS. 1, 7 and 8.

We use the same technique as described with respect to FIG. 10, except now the pel register 112 is 13 bits wide and produces four pixels (that is the pixel register is four pixels long). The table 160 is changed from that shown in FIG. 11 though we use the same protocol. That is, processing of the four pixels begins at a white level and based on the position of the black bits in the 13-bit pel buffer we index into the table 160 to subtract the effect of the black bits (again assuming that the run of black bits beginning at the first transition continues to the end). We then examine the pel register 112 to see if there is a black/white transition, and if there is we go back into the table 160 to cancel out the effect of the black bits which were assumed to be present. We then examine the pel register 112 again for a white/black transition, and continue the process until each transition has been treated. For the embodiment employing two bit planes per group, the same allowed states are possible, other states are thresholded into one of these four allowed states. On the other hand, for the three bit planes per group embodiment, more allowed states exist but again the possible states exceed the allowed states so we re-threshold again before storing the contents of the pixel register into the buffer 20.

While this software is configured on the assumption that the output buffer is initialized to all white, it should be clear that is not essential to the invention. In cases where initializing the output buffer to all black is desirable it is accomplished by simple changes to the software. The only other change is to alter the software to search for a black/white transition rather than white/black transition.

The foregoing describes an embodiment of the invention in which facsimile data is received in raw, or unencoded, form. In many transmission applications of facsimile data, the data is encoded using one of several formats. It can be decoded into a run end form. In this form, instead of transmitting bits which map one for one onto the image, the facsimile data is encoded after scanning. More particularly the raw facsimile data is viewed as a succession of runs. Information concerning each run is transmitted by identifying, in the transmitted information, the location in the image at which the run ends. In this regard reference is made to the commonly-assigned copending application "Method for Encoding and Decoding a Digital Image" in the name of Mitchell et al (YO983-095), Ser. No. 571,239, filed Jan. 16, 1984 and "An Improved Method for Converting a Bit Map of an Image to a Run Length or Run End Representation" by Anderson et al U.S. Pat. No. 4,646,356. The disclosure of these applications is incorporated herein by this reference. In a preferred embodiment of the invention the facsimile data which is received is converted to run end form either by decoding the compressed data or by converting raster data to run end form.

One form of run end data (as described in the above-referenced application) is made up of a sequence of half words for each line of pel data. The first half word identifies the number of bytes of run end data plus two bytes for the count, following this half word are three half words identifying zero run ends, this is followed by an arbitrary number of pairs of white/black run ends and the line is terminated by two additional copies of the last black run end. If the particular line begins with a black run, the first white run end must be specified as zero. If a line ends with a white run, the last black run end will be the same as the last white run end, so that in fact there are three additional copies of the last real run end. Thus, in this particular format, the three line bit image (where black is represented by a binary one and a white is represented by a binary zero) for the following three lines:

| | |
|---|---|
| 11111111 11000000 00000000 00010000 | (Line 1) |
| 00000000 00000000 00000000 00000000 | (Line 2) |
| 10100000 10001111 11111111 11110001 | (Line 3) | produce three run end encoded vectors with the following half words:

| | |
|---|---|
| 24 0 0 0 0 10 27 28 32 32 32 32 | (Line 1 run end coded) |
| 16 0 0 0 32 32 32 32 | (Line 2 run end coded) |
| 32 0 0 0 0 1 2 3 8 9 12 28 31 32 32 32. | (Line 3 run end coded) |

One way to treat run end facsimile data is to first decode that data into a bit image map, and then apply the invention to the bit image map. Rather than employ this technique, however, we have fashioned software (which is described below) which operates on the run end data itself to produce a sequence of video pixels, wherein a set of four video pixels represents (or derives from) 13 facsimile pels, even though the end run data does not explicitly identify each of the 13 pels.

That software is reproduced below.

| | |
|---|---|
| word xskip; | (pels to skip on left edge) |
| half endpt(base b2); | (end point based on b2) |
| half endpt2(base b2+2); | (next end point based on b2) |
| word x(base b0); | (output word based on b0) |
| word del(base b1,0); | (indexed table value based on b1) |
| (initialize) | |

(Fill output buffer with white pixels.)

| | |
|---|---|
| b2=curpts | (point b2 at buffer of current endpoints) |
| if endpt > 16 | (if more than one (all white) run) |
| b2=b2+8 | (point to first white run) |
| dd8=endpt | (load white run) |
| xskip=32 | (pels to skip on left edge) |
| (skip 32 pels on left edge) | |
| begin | (loop to skip left edge pels) |
| if dd8 < xskip | (if white run end < xskip) |
| if endpt2 < xskip | (if black run end < xskip) |
| b2=b2+4 | (point to next endpt) |
| dd8=endpt | (load white run) |
| repeat | (repeat loop) |
| else | (black run straddles edge) |
| dd8=xskip | (set white run to xskip) |
| endif | |
| endif | |
| endbegin | (end of loop to skip left edge pels) |

(main part of code to process each white/black pair of runs)

| | |
|---|---|
| dd9=xskip+(128*13) | (end of output line) |
| if dd8 1lt dd9 | (if endpt < line length) |
| b1=addr deltbl | (load address of delta table) |
| b0=linenow | (point to current line) |
| dd7=−xskip | (eliminate skipped pels) |
| b2=b2+2 | (point to next black run) |
| begin | (loop to process runs) |
| if dd8 1lt dd9 | (if endpt1 < line length) |
| (find four byte unit where white run ends) | |
| dd7=dd7+dd8 | (add in new endpt to remainder minus old endpt) |
| if dd7 ≧ 13 | (if ≧ 13 pels) |
| if dd7 ≧ 2*13 | (if ≧ 26 pels) |
| if dd7 ≧ 4*13 | (if ≧ 52 pels) |
| if dd7 ≧ 8*13 | (if ≧ 104 pels) |
| if dd7 ≧ 16*13 | (if ≧ 208 pels) |
| if dd7 ≧ 32*13 | (if ≧ 416 pels) |

-continued

```
if dd7 ≧ 64*13          (if ≧ 832 pels)
  dd7=dd7−(64*13)       (take off 832)
  b0 =b0 +(64*4)        (add 256 bytes)
  endif
if dd7 ≧ 32*13          (if ≧ 416)
  dd7=dd7−(32*13)       (take off 416)
  b0=b0+(32*4)          (add 128 bytes)
  endif
  endif
if dd7 ≧ 16*13          (if ≧ 208 pels)
  dd7=dd7−(16*13)       (take off 208)
  b0=b0+(16*4)          (add 64 bytes)
  endif
  endif
if dd7 ≧ 8*13           (if ≧ 104)
  dd7=dd7−(8*13)        (take off 104)
  b0=b0+(8*4)           (add 32 bytes)
  endif
  endif
if dd7 ≧ 4*13           (if ≧ 52 pels)
  dd7=dd7−(4*13)        (take off 52)
  b0=b0+(4*4)           (add 16 bytes)
  endif
  endif
if dd7 ≧ 2*13           (if ≧ 26 pels)
  dd7=dd7−(13*2)        (take off 26)
  b0=b0+(2*4)           (add 8 bytes)
  endif
  endif
if dd7 ≧ 13             (if ≧ 13)
  dd7=dd7−13            (take off 13)
  b0=b0+4               (add 4 bytes)
  endif
  endif
```

(b0 points to word in buffer where white run ends) (dd7 - the remainder modulo 13 of white run end)

```
dd2=dd7
dd2=sll dd2 2          (addressing by 4 bytes)
x=x−del(dd2)           (assume black from end
                        of white)
dd7=dd7−dd8            (take off old endpt)
dd8=endpt              (load new black endpt)
b2=b2+2                (point to next endpt)
if dd8 lgt dd9         (if beyond right edge
                        of output image)
  dd8=dd9              (reset to right edge)
  endif
dd7=dd7+dd8            (add in new endpt)
begin                  (loop to put in black
                        pels)
  if dd7 ≧ 13          (if remainder ≧ 13)
    dd7=dd7−13         (take off 13)
    b0=b0+4            (point to next word)
    x=x−del(0)         (subtract from white
                        level all black)
    repeat             (repeat loop to put in
                        black pels)
    endif
  dd2=dd7
  dd2=sll dd2 2
  x=x+del(dd2)         (add start of white run)
  endbegin
  dd7=dd7−dd8          (take off old endpt)
  dd8=endpt            (load new white endpt)
  b2=b2+2              (point to next endpt)
  repeat               (repeat loop to
                        process runs)
  endif
endbegin               (end of loop to
                        process runs)
endif
endif
```

The software described above requires a table (similar to the table of FIG. 11) and that table is reproduced below.

| DEL Table (Hex) | | | |
|---|---|---|---|
| D0D0D0D0 | 90D0D0D0 | 50D0D0D0 | 10D0D0D0 |
| 00A0D0D0 | 0060D0D0 | 0020D0D0 | 0000B0D0 |
| 000070D0 | 000030D0 | 000000C0 | 00000080 |
| 00000040 | | | |

Since the table must be entered at any one of 13 bit positions, there are 13 entries in the table. Each entry identifies a quantity (for example the first entry is D0D0D0D0) which is to be subtracted or added (depending upon the character of the transition) for a white to black or black to white transition, respectively, to the initialized pixel register. This software is divided into two parts and employs two buffers and a table. A first buffer is long enough to contain run end coded fax data for an entire line, examples are any of lines 1-3 in run end coded form as reproduced above. The second buffer stores four pixel units for every 13 bits of raw fax data. The second buffer is manipulated four pixels at a time. In the low resolution case the resulting contents of the second buffer are transferred to the buffer 20 for each line of fax data. In the high resolution case the second buffer is written to the buffer 20 once for every two fax lines. The software is divided into two portions, the initial portion merely identifies the first run end beyond the initial 32 pels which are ignored. The second part (located below the comment—main part of code) modifies the initialized second buffer for each of the significant white/black or black/white transitions. This modification uses the same table process described above using the DEL Table reproduced above. The table has an entry for each of the thirteen bit positions at which a transition could be located. Because the data is in run end rather than raw form, the main code uses modulo 13 arithmetic to identify the location of corresponding raw bit transitions. Once identified the table is used to modify the second buffer. Once each significant transition (in the center 1664 raw pels) is treated a new line of fax data is inserted into the first register. If we are in low resolution, the results in the second buffer is written to the buffer 20. If we are in high resolution the second buffer is saved and is the initial state for the second fax line. On every other line of fax data the second buffer is written to buffer 20.

As indicated above, we have illustrated an embodiment in which our frame buffer 20 is eight bits deep, it should be apparent that the depth of the frame buffer can be increased or decreased (although increasing the depth of the frame buffer will of course provide more capacity), and as the depth of the frame buffer is increased, more document segments may be stored within a given address space.

The application has described embodiments where three or six pels are converted to a single pixel (ratios of 3/1 and 6/1, respectively) and 13 or 26 pels have been converted to four pixels (ratios of 13/4 and 26/4). It should be apparent that these are exemplary, and any other ratio could be employed.

Of course the number of pels which are represented by a single pixel determines how many different allowed states that pixel should have (rounded of course when necessary) while we have employed a rethresholding operation so as to distribute the number of allowed states throughout the gray scale of the video display, this operation of course is only necessary because of the characteristics of our video display.

We have also mentioned that while the examples described herein relate to segmenting a document, and scrolling a document, in the vertical direction, there is no reason why the same techniques could not be applied to segmenting a document horizontally, and scrolling it horizontally.

Before describing these other scrolling capabilities, reference is made to FIG. 13 to show, in more detail, the actual structure of the address register 70. As shown in FIG. 13, many video displays include a horizontal or H address register or counter 271, as well as a vertical or V address register 272. Each of these counters are incremented respectively by H CLK and V CLK (of course the H clock operates at a higher rate than the V clock). Each of these registers can be individually initialized. The registers are arranged to wrap around, that is when they reach the terminal count corresponding to the end of the display they are automatically reset to an initial count. For example the H address counter 271 may count from 0 to 511 (512 pixels). If the count had started at an initial count of 0 the counter will count up to 511, the next time it is incremented, the register will hold a zero count. On the other hand, if the register is initialized at a count of 128, it will count up to 511, reset itself to zero on the next count and count up to 127 in the same time period it would have counted from 0 to 511 if it had started counting from a zero or reset state. The V address register 272 is similar although it operates at a slower rate because its incrementing clock (VCLK) is slower than the HCLK. In those display arrangements in which the H counter 271 and the V counter 272 are separately accessible, the operator, employing the present invention can use the initial counts so as to provide for scrolling in any direction.

For example, FIG. 14A shows a particular document (image) which has been segmented into three horizontal segments I, II and III, respectively. As shown in FIG. 14B, each of the segments I, II and III is separately stored in a different bit plane group of the buffer 20, wherein the different bit plane groups are identified as G1-G3, respectively.

The operator can create a display such as that shown in FIG. 14C by initializing the address register to the location C in FIG. 14A. The operator can then switch to the display shown in FIG. 14D by altering the contents of the address register 70 to identify the point D, in FIG. 14A. Accordingly, it should be apparent that scrolling can be accomplished horizontally (as shown in FIGS. 14A-14D) as well as vertically.

To illustrate how scrolling can be accomplished in an arbitrary direction, reference is now made to FIGS. 15A-D. More particularly, FIG. 15A shows a document (image) which has been segmented into four segments I-IV, respectively. FIG. 15B shows how the contents of each of the segments I-IV are stored in a different group of bit planes including groups GP1-GP4. An operator desiring to view a display such as that shown in FIG. 15C initializes the H register 271 and the V register 272 to the coordinates of the point A. If, after viewing the display shown in FIG. 15C the operator desires to show a display such as that shown in FIG. 15B, the H and V registers 271, 272 are reinitialized to the coordinates identified by the point B.

While the preceding discussion has not mentioned the location of the control bits in order to effect this operation, the preceding description has made clear that if the buffer 20 has sufficient depth, the appropriate control bits can be written to unused bit planes in the buffer. On the other hand, in the event that the buffer 20 has inadequate depth to accommodate both the document segments as well as the control bits, then the control bits can be separately stored in an associated control buffer such as that shown in FIG. 7. As previously noted, in addition to facsimile imaging there are a variety of image systems available today that can scan an image, compress it, transmit or store it, decompress it, and display or print it. Many of these systems deal with scanned binary images, those in which each pixel element, or pel, is represented by one of two values, 0 or 1. Normally the binary image is stored and transmitted in compressed form, since this can often greatly reduce the transmission time and storage requirement.

Fast algorithms are known for the decompression of binary images. For example, J. L. Mitchell et al in previously-mentioned, co-pending U.S. Pat. application Ser. No. 571,239 entitled, "Method for Encoding and Decoding a Digital Image", and assigned to the same assignee as the present application, describe a method for converting the compressed data into a run-end representation of the binary image, and in co-pending, commonly assigned U.S. Pat. No. 4,596,039 entitled, "A Method for Converting an Image from a Run End or Run Length Representation to a Bit Map", describe a method for converting from a run-end representation into a bit-map representation. Together, they perform the decompression of a binary image into a bit-map representation.

Printing images in their bit-map format is usually a convenient operation as most printers are binary devices with resolutions well matched to the resolutions of the scanners used to pick up the images to be printed.

Displays, on the other hand, often have much less resolution than scanners. However, they do often have the ability to display multiple shades of gray, a capability that can be used to obtain a high-quality representation of a binary image. If each picture element, or pixel, of the multi-bit display has an intensity proportional to the sum of the values of the pels in a rectangular region of the scanned binary image, then a high-quality representation is obtained. A further embodiment of the present invention is directed to providing a fast algorithm for constructing such a multi-bit image.

Although this multi-bit image could be formed by first constructing the run-end representation, then constructing the binary representation, and then summing the pels in rectangles, a faster way to produce such an image is to first construct the run-end representation, and then to construct the multi-bit representation directly from the run-end representation. The algorithm of the foregoing embodiment of the invention is capable of so converting run-end data to a multi-bit representation. However, the further embodiment of the invention which will now be described presents another, and potentially faster, method for constructing a multi-bit representation from the run-end data.

The pels of the binary image may be labelled as $p(i,j)$, where $p(i,j)$ is the pel in the i'th line and the j'th column. Each pel $p(i,j)$ takes on a value of either 1 or 0, with 1 corresponding to black, and 0 corresponding to white. The pixels of the multi-bit representation are labelled as $P(I,J)$, where $P(I,J)$ is the pixel in the I'th line and J'th column of the multi-bit image. Each pixel $P(I,J)$ takes on a non-negative integer value.

As noted before, the values of pixels in the multi-bit image that we wish to construct are sums of the values of the pels in a rectangular region. That is, $P(I,J)$ is the sum of all p(i,j) such that (HREDUCE*(I−1))+1≤i≤(HREDUCE*I)+1, and (VREDUCE*(J−1))+1≤j≤(VREDUCE*J)+1.

This embodiment of the invention processes VREDUCE lines of run-end data as follows.

1. The transient line counter is zeroed.
2. The input line is tested to see if it is all-white. If the input line is all-white, and the transient line counter is not zero, then we proceed to step 6. If the input line is all-white, and the transient line counter is zero, then the output line is filled with zeros and we proceed to step 6. If the input line is not all-white, we proceed to step 3.
3. The input line, in run-end form, is lengthened by appending a long white run to the end of it.
4. The input line is processed according to the length and color of each run. There is distinct processing for short white runs, long white runs, short black runs and long black runs. The processing proceeds from one type to another, depending on the length and color of the run currently being processed.
5. Because a long white run was appended to the input line in run-end form, the processing of the line will be completed with the processing of a long white run. Testing for the completion of the processing of an input line is only needed (and performed) in the processing for long white runs.
6. The transient line counter is incremented by 1. If the transient line counter is less than VREDUCE, then we repeat the processing described above, beginning with step 2; otherwise the processing of the VREDUCE input lines is complete.

The processing of long white runs for the first input line consists of setting storage to zero in the output line. For subsequent input lines, the processing of long white runs leaves the output line unchanged.

In the processing of long black runs, a vector containing the sums corresponding to a long run of black pels is loaded into a register. For the first input line, this vector is written into the output line while the long black run continues. For subsequent input lines, this vector is added to the prior contents of the output line while the black run continues.

In the processing of short white runs and short black runs, the variable NBITS contains the number of additional pels on this input line needed to complete this sum, which is HREDUCE minus the number of pels already processed as a part of this sum. The variable LBITS contains the number of unprocessed pels remaining in this run. Sums that are formed by the processing for short runs are called "mixed sums" in the following. Such sums usually contain the values of both black pels and white pels.

An important feature of the invention is the accumulation, during the processing of short runs, of a multiplicity of sums in a register prior to modifying the contents of the output line. This is accomplished by the following steps.

1. The register is initialized to an initial value.
2. After each new sum has been accumulated, the register is tested. If the register can accommodate another sum, the contents of the register are shifted enough bits to accommodate another sum. If it cannot accommodate another sum, the contents of the register are output to memory.

In the processing of the first input line, when a full complement of mixed sums has been accumulated, the full complement of sums is simultaneously written into the output line. In the processing of subsequent input lines, when a full complement of mixed sums has been accumulated, the full complement of sums is simultaneously added to the sums previously accumulated in the output line.

In the preferred version of this embodiment, as described below, the sums are accumulated as four-bit quantities, and they are accumulated in the least-significant four bits of a sixteen-bit register. After each sum is accumulated, the register is tested. If it is negative, its contents are shifted four bits to the left. If it is positive, its contents are written if the first input line to contribute to the output line is being processed, or added to previous values in the output line if a subsequent input line is being processed.

It should be noted that initializing the register with the value TINIT=hex'FFF0', and with HREDUCE<8, the register will become positive after it has been shifted to left by four bits three times.

The run-end representation of a line of pels that is used in the preferred embodiment is a series of two-byte numbers, which will be called half-words. The half-words for a line of pels contain, in order, the number of bytes of data (two bytes for the count and two bytes for each run-end), three zeroes, a number of pairs of white/black run-ends, and two additional copies of the last black run-end. For example, if no padding or skipping is specified, the image

| ffc00010 | ffffe00f | 80008001 |
| 00000000 | 00000000 | 00000000 |
| a0affff1 | 0000003f | 807c0004 | would produce a run-end buffer containing the following half-word entries:

| 36 | 0  | 0  | 0  | 0  | 10 | 27 | 28 | 32 | 51 |
| 60 | 65 | 80 | 81 | 95 | 96 | 96 | 96 | 16 | 0  |
| 0  | 0  | 96 | 96 | 96 | 96 | 52 | 0  | 0  | 0  |
| 0  | 1  | 2  | 3  | 8  | 9  | 10 | 11 | 12 | 28 |
| 31 | 32 | 58 | 65 | 73 | 78 | 93 | 94 | 96 | 96 |
| 96 | 96 |    |    |    |    |    |    |    |    |

The operation of this embodiment of the invention will now be described. This processing accepts as its inputs: SUMPTR, the address of the first byte of the first output line; RUNPTR, the address of the byte of the run-end representation of the first input line; ILINES, the number of input lines to be processed; PELSUM, the number of horizontal pels to a sum; OLEN, the length of an output line in bytes; and the vector VRED(*). The vector VRED(*) adds to this processing the ability to perform a repeating sequence of vertical reductions. For example, if VRED(1)=5, VRED(2)=4, and VRED(3)=0, then the first five input lines would be processed with VREDUCE=5, and the next four input lines would be processed with VREDUCE=4. The condition VRED(3)=0 indicates that the sequence of vertical reductions should repeat again, beginning with VRED(1).

The pointer SPTR is a transient pointer that points to the beginning of the current output line, and the pointer RPTR is a transient pointer that points to the beginning of a line of run-end data. The variable LINES contains the number of input lines processed, and the variable ILINES contains the total number of input lines to be processed.

FLOW CHART OF THE PROCESSING

A flow chart of the processing to convert lines of runs to lines of sums is given in FIG. 16. This processing begins by testing the flag RC. The condition RC-=0, indicates that an output line has been partially completed. In this case, the processing proceeds to the beginning of the inner loop described below. If RC=0, then processing begins with the initializations described in the next paragraph.

The initializations begin by setting SPTR to the value of SUMPTR, LINES to 0, and RIX to 0. Next, an outer loop is entered, RLINES is initialized to zero, and RED takes on the value of VRED(RIX). If RED-=0, then RIX is incremented, and processing proceeds to the inner loop processing described in the next paragraph. If RED=0, then all the reductions of the repeating sequence have been executed, so RIX is reset to 0, RED takes on the new value of VRED(RIX), and the processing proceeds to the inner loop processing described in the next paragraph.

An inner loop is now entered which processes RED input lines and produces one output line. First, IBYTES is set to the number of bytes in this line of run-end data, HI(0). Next IBYTES is tested. If IBYTES=0, then there is no more input run-end data to process, the flag RC is set to 1, and the processing to convert runs to sums is complete. If IBYTES-=0, then we proceed to test RIX. If RIX=0, then this is the first input line to contribute to the output line, so the processing "PROCESS FIRST INPUT LINE" is executed. If RIX-=0, then this is not the first input line to contribute to the output line, and the processing "PROCESS SUBSEQUENT INPUT LINE" is executed. The processing of an input line will be described below. After the input line is processed, RPTR is incremented by IBYTES, LINES is incremented by 1, and RLINES is incremented by 1. If RLINES<RED, the processing of the inner loop is repeated; otherwise the processing proceeds as described in the next paragraph.

Next, SPTR is incremented by OLEN and LINES is compared with ILINES. If LINES<ILINES, the processing of the outer loop is repeated; otherwise the flag RC is set to 0, indicating that all requested input lines were processed, and the processing is complete.

PROCESSING TO CONVERT SUMS TO RUNS FOR ONE LINE

The processes labelled "PROCESS FIRST INPUT LINE" and "PROCESS SUBSEQUENT INPUT LINE" in FIG. 16 will now be described in detail. These processes differ only in how their output is treated. Both are described in the following sections which correspond to the illustrations given in FIGS. 17 through 27. Their differences will be described in the descriptions that correspond to FIGS. 28 through 35.

In the following descriptions, IPELS is the number of pels in the input line in run-end form, IBYTES is the number of bytes of run-end data, and HI(IIX) is a half-word (two bytes) based on IPTR, and HO(OIX) in a half-word based on OPTR. The variable PELSUM contains the value of HREDUCE. The variable L4SUMS is the number of pels on the current input line which when summed together form exactly four sums, the variable L8SUMS is the number of pels on the current input line which when summed together form exactly eight sums, and the variable L32SUMS is the number of pels on the current input line which when summed together form exactly thirty-two sums. Thus L4SUMS=4*HREDUCE L8SUMS=8*HREDUCE, and L32SUMS=32*HREDUCE.

INITIALIZATIONS FOR CONVERSION OF A LINE OF RUNS INTO SUMS

In FIG. 17, the "Initializations for converting a line of runs to sums" is given. These initializations begin by setting IPTR to the value of RPTR plus 8. IPTR now points to the first white run-end. Since HI(IIX) is based on IPTR, HI(0) now contains the value of the first white run-end. Next, LBITS takes on the value of the first white run-end. If LBITS=IPELS, then the line is all white, and the processing labelled "OUTPUT ALL-WHITE LINE" is executed, and the processing of this input line is complete; otherwise the processing proceeds as described in the following paragraph. The next step of the processing is to pad the line, in run-end representation, with a run of white pels so that the padded line will have a length of OPELS. This is done to guarantee that the line, in run-end representation, will end in a long white run, of length L4SUMS or greater.

To do this, IPTR is first incremented by IBYTES-16. Now HI(0) contains the value of the last white run-end, HI(2) contains the value of the last black run-end, and HI(4) and HI(6) contain the two replicas of the last black run-end. Next, the value of the last white run-end, HI(0), is compared with the value of the last black run-end, HI(2).

If they are the same, then the last non-zero length run was a white run, the line is padded by setting the values of HI(0) and HI(2) to OPELS, and processing proceeds as described in the next paragraph.

If HI(0) and HI(2) are not the same, then the last non-zero length run was a black run, the line is padded by setting the values of HI(4) and HI(6) to OPELS, and the processing proceeds as described in the next paragraph. In this case the last black run-end is no longer replicated.

Finally, IPTR is reset to RPTR+8, IIX is set to zero, and LBITS takes on the value of the first white run-end.

If LBITS is not zero, the processing proceeds to the "Processing for long white runs," described with reference to FIG. 18.

If LBITS=0, LBITS takes on the value of the first black run-end, and the processing proceeds to the "Processing for long black runs," described with reference to FIG. 23.

PROCESSING FOR LONG WHITE RUNS

In FIG. 18, the processing for long white runs is described. When this processing begins, LBITS contains the length of an unprocessed white run. It begins by comparing LBITS with L4SUMS. If LBITS<L4SUMS, the length of the white run length is insufficient to complete four sums, and the processing proceeds to entry point "SW" of the "Processing for short white runs," described in FIG. 19. If LBITS≧L4SUMS, then the white run length remaining is sufficient to complete four sums, and the processing proceeds as described in the following paragraph.

Next a loop is entered which begins by comparing LBITS with L32SUMS. If LBITS≧L32SUMS, LBITS is decremented by L32SUMS, processing labelled "OUTPUT 32 WHITE SUMS" is executed, and the loop repeats.

If LBITS<L32SUMS, the loop is exited and processing proceeds as described in the next paragraph.

Recall that in the preferred embodiment the sums have been chosen to be four bits in length, so there are two sums in each byte of output data. Next a loop is entered which begins by comparing LBITS with L8SUMS. If LBITS≧L8SUMS, LBITS is decremented by L8SUMS, processing labelled "OUTPUT 8 WHITE SUMS" is executed, and the loop repeats. If LBITS<L8SUMS, the loop is exited and the processing proceeds as described in the following paragraph.

Next LBITS is compared with L4SUMS. If LBITS≧L4SUMS, then LBITS is decremented by L4SUMS, processing labelled "OUTPUT 4 WHITE SUMS" is executed, and the processing proceeds as described in the next paragraph. If LBITS<L4SUMS, the processing proceeds as described in the next paragraph.

LBITS is next compared to zero. If LBITS>0, then there is a short white run remaining, and processing proceeds to entry point "SW" of the "Processing for short white runs" described in FIG. 19. If LBITS=0, then LBITS takes on the value of the next run length, which is the run length of a black run. If the value of the black run length is zero, then the processing for this line is complete; otherwise processing proceeds to the "Processing for long black runs" which is described below with reference to FIG. 23.

PROCESSING OF SHORT WHITE RUNS

In FIG. 19, the "Processing for short white runs" is described. This processing has two entry points, labelled "SW" and "SWO". If this processing is entered from entry point "SW", the variable NBITS is initialized to the value of PELSUM, T is initialized to the value of TINIT, and the processing proceeds to the processing described in the next paragraph. If this processing is entered at entry point "SWO", the processing begins with the processing described in the next paragraph.

Note that in this preferred embodiment, TINIT=X'FFF0' which will become positive after T has been shifted left by four bits three times. Thus, T will not test positive until four sums have been accumulated in T.

For this choice of TINIT, PELSUM must be less than 8.

Next LBITS is compared to NBITS. If LBITS>NBITS, the processing proceeds to the "Processing for short white runs with LBITS>NBITS" which is described below with reference to FIG. 20. If LBITS<NBITS, the processing proceeds to the "Processing for short white runs with LBITS=NBITS" which is described below with reference to FIG. 21. If LBITS=NBITS, the processing proceeds to the "Processing for short white runs with LBITS=NBITS" which is described below with reference to FIG. 22.

PROCESSING OF SHORT WHITE RUNS WITH LBITS>NBITS

The "Processing of short white runs with LBITS>NBITS" is shown in FIG. 20. Note that when LBITS>NBITS, the number of unprocessed pels remaining in the run will complete the sum for this input line, and that subsequently there will be unprocessed pels remaining. This processing begins by decrementing LBITS by NBITS, which completes this sum.

When no more sums can be accumulated in T, T will be positive. Next, T is compared with zero. If T>O, the processing "OUTPUT 4 MIXED SUMS" is executed and the processing proceeds to processing labelled "Process long white runs" which is illustrated in FIG. 18 and described above. If T≦0, then T has space to accumulate more sums, T is shifted left by four bits, NBITS is reset to the value of PELSUM, and the processing proceeds to entry point "SWO" of the processing labelled "Processing for short white runs" which was described above and illustrated in FIG. 19.

PROCESSING OF SHORT WHITE RUNS WITH LBITS<NBITS

A flow chart of the "Processing of short white runs with LBITS<NBITS" is given in FIG. 21. Note that when LBITS<NBITS, the number of unprocessed pels remaining in the run will not complete the sum for this input line. In this processing NBITS is decremented by LBITS, LBITS takes on the value of the next run length, and the processing proceeds to entry point "SBO" of the processing labelled "Processing for short black runs" which will be described below and is illustrated in FIG. 24.

PROCESSING OF SHORT WHITE RUNS WITH LBITS=NBITS

The "Processing of short white runs with LBITS=NBITS" is shown in FIG. 22. Note that when LBITS=NBITS, the number of unprocessed pels remaining in the run will complete the sum for this input line, but that subsequently there will be no unprocessed pels remaining. This processing begins by assigning to LBITS the value of the next run length. T is then compared with zero. If T>O, then we have accumulated a full complement of sums in T, these sums are output with processing labelled "OUTPUT 4 MIXED SUMS" and illustrated in FIG. 33, and the processing proceeds to the "Processing for long black sums" which is illustrated in FIG. 23. If T≦O, then NBITS is reset to the value of PELSUM, T is shifted left by four bits, and the processing proceeds to the entry point "SBO" of the "Processing for short black runs" which is illustrated in FIG. 24 and described below.

PROCESSING FOR LONG BLACK RUNS.

In FIG. 23, a flow chart of the processing for long black runs is given. When this processing begins, LBITS contains the length of an unprocessed black run. It begins by comparing LBITS with L4SUMS. If LBITS<L4SUMS, the black run length is insufficient to complete four sums, and the processing proceeds to entry point "SB" of the "Processing for short black runs" described with reference to FIG. 24. If LBITS≧L4SUMS, then the black run length remaining is sufficient to complete four sums, and the processing proceeds as described in the following paragraph.

Next a loop is entered which begins by comparing LBITS with L8SUMS. If LBITS≧L8SUMS, LBITS is decremented by L8SUMS, the processing labelled "OUTPUT 8 BLACK SUMS" is executed, and the loop repeats. The processing labelled "OUTPUT 8 BLACK SUMS" is illustrated in FIG. 34, and described below. If LBITS<L8SUMS, the loop is exited and the processing proceeds as described in the following paragraph.

Next LBITS is compared with L4SUMS. If LBITS≧L4SUMS, then LBITS is decremented by L4SUMS, the processing labelled "OUTPUT 4 BLACK SUMS" is executed, and the processing proceeds as described in the next paragraph. The processing label "OUTPUT 4BLACK SUMS" is illustrated in FIG. 35 and described below. If LBITS<L4SUMS, the processing proceeds as described in the next paragraph. LBITS is next compared to zero. If LBITS=0, then there is a short black run remaining, and processing proceeds to entry point "SB" of the "Processing for short black runs" described in FIG. 24. If LBITS=0, then LBITS takes on the value of the next run length, which is the length of a white run. Then the processing proceeds to the "Processing for long white runs" which was described above.

PROCESSING OF SHORT BLACK RUNS

In FIG. 24, the "Processing for short black runs" is illustrated. This processing has two entry points, labelled "SB" and "SBO". If this processing is entered from entry point "SB" the variable NBITS is initialized to the value of PELSUM, T is initialized to the value of TINIT, and the processing proceeds to the processing described in the next paragraph. If this processing is entered at entry point "SBO", the processing begins with the processing described in the next paragraph.

Next LBITS is compared to NBITS. If LBITS>NBITS, the processing proceeds to the "Processing for short black runs with LBITS>NBITS" which is described below with reference to FIG. 25. If LBITS<NBITS, the processing proceeds to the "Processing for short black runs with LBITS<NBITS" which is described below with reference to FIG. 26. If LBITS=NBITS, the processing proceeds to the "Processing for short black runs with LBITS=NBITS" which is described below with reference to FIG. 27.

PROCESSING OF SHORT BLACK RUNS WITH LBITS>NBITS

The "Processing of short black runs with LBITS>NBITS" is illustrated in FIG. 25. Note that when LBITS>NBITS, the number of unprocessed pels remaining in the run will complete the sum for this input line, and that subsequently there will be unprocessed pels remaining. This processing begins by incrementing T by NBITS, which completes this sum. The variable LBITS is then decremented by NBITS. Next, T is compared with zero.

If T>0, the processing "OUTPUT 4 MIXED SUMS" is executed and the processing proceeds to processing labelled "Process long black runs" which is illustrated in FIG. 23 and described above.

If T≦0, then T has space to accumulate more sums, T is shifted left by four bits, NBITS is reset to the value of PELSUM, and the processing proceeds to entry point "SBO" of the processing labelled "Processing for short black runs" which was described above and illustrated in FIG. 24.

PROCESSING OF SHORT BLACK RUNS WITH LBITS<NBITS

A flow chart of the "Processing of short black runs with LBITS<NBITS" is given in FIG. 26. Note that when LBITS<NBITS, the number of unprocessed pels remaining in the run will not complete the sum for this input line. In the processing, T is incremented by LBITS, NBITS is decremented LBITS, LBITS takes on the value of the next run length, and the processing proceeds to entry point "SWO" of the processing labelled "Processing for short white runs" which was described above and illustrated in FIG. 19.

PROCESSING OF SHORT BLACK RUNS WITH LBITS=NBITS

The "Processing of short black runs with LBITS=NBITS" is illustrated in FIG. 27. Note that when LBITS=NBITS, the number of unprocessed pels remaining in the run will complete the sum for this input line, but that subsequently there will be no unprocessed pels remaining.

This processing begins by incrementing T by the value of LBITS and assigning to LBITS the value of the next run length. The processing that assigns the next run length to LBITS is described below and illustrated in FIG. 29.

T is then compared with zero. If T>0, then we have accumulated a full complement of sums in T, these sums are output with processing labelled "OUTPUT 4 MIXED SUMS" and illustrated in FIG. 33, and the processing proceeds to the "Processing for long white sums" which is illustrated in FIG. 18. If T≦0, then NBITS is reset to the value of PELSUM, T is shifted left by four bits, and the processing proceeds to the entry point "SWO" of the "Processing for short white runs" which is illustrated in FIG. 19 and described above.

PROCESSING TO "OUTPUT ALL-WHITE LINE"

When the current input line is the first input line to contribute to an output line, this process consists of filling the output line with zeroes, as illustrated in FIG. 28. When the current input line is not the first input line to contribute to an output line, no processing is required to output the all white line.

PROCESSING TO ASSIGN THE NEXT RUN LENGTH TO LBITS

A flow chart for the processing to assign the next run length to LBITS is given in FIG. 29. For the run-end representation of data described above, this processing consists of assigning to LBITS the difference of HI(IIX+2) and HI(IIX), and of incrementing the value of IIX by 2.

PROCESSING LABELLED "OUTPUT 32 WHITE SUMS"

The processing labelled "OUTPUT 32 WHITE SUMS" is illustrated in FIG. 30. When the current line is the first input line to contribute to an output line, this processing consists of writing 16 bytes of zeros onto the output line and incrementing OIX by 16, as shown in FIG. 30(a). When the current input line is not the first input line to contribute to an output line, this processing consists of incrementing OIX by 16, as shown in FIG. 30(b).

PROCESSING LABELLED "OUTPUT 8 WHITE SUMS"

The processing labelled "OUTPUT 8 WHITE SUMS" is illustrated in FIG. 31. When the current line is the first input line to contribute to an output line, this processing consists of writing 4 bytes of zeros onto the output line and incrementing OIX by 4, as shown in FIG. 31(a). When the current input line is not the first input line to contribute to an output line, this processing consists of incrementing OIX by 4, as shown in FIG. 31(b).

PROCESSING LABELLED "OUTPUT 4 WHITE SUMS"

The processing labelled "OUTPUT 4 WHITE SUMS" is illustrated in FIG. 32. When the current line is the first input line to contribute to an output line, this processing consists of writing 2 bytes of zeros onto the output line and incrementing OIX by 2, as shown in FIG. 32(a). When the current input line is not the first input line to contribute to an output line, this processing consists of incrementing OIX by 2, as shown in FIG. 32(b).

PROCESSING LABELLED "OUTPUT 4 MIXED SUMS"

A flow chart of the processing labelled "OUTPUT 4 MIXED SUMS" is given in FIG. 33. If the current input line is the first input line to contribute to and output line, this processing consists of writing T into HO(OIX) and incrementing OIX by two, as shown in FIG. 33(a). If the current line is not the first input line to contribute to an output line, this processing consists of adding the value of T to HO(OIX) and incrementing OIX by two, as shown in FIG. 33(b).

PROCESSING LABELLED "OUTPUT 8 BLACK SUMS"

A flow chart for the processing labelled "OUTPUT 8 BLACK SUMS" is given in FIG. 34. This processing utilizes the variable V4SUMS, which contains a vector of four sums that will be output as long as the input line remains black. Since each of the four sums represents a sum of HREDUCE black pels, each sum equals HREDUCE. In the preferred embodiment, the sums are stored as four-bit quantities, so V4SUMS= HREDUCE*(1+16+256+4096). If the current input line is the first input line to contribute to an output line, this processing consists of writing the value of V4SUMS into HO(OIX) and HO(OIX+2), and then incrementing OIX by 4, as shown in FIG. 34(a). If the current input line is not the first input line to contribute to an output line, this processing consists of adding V4SUMS to HO(OIX) and HO(OIX+2) and of incrementing OIX by 4, as shown in FIG 34(b).

PROCESSING LABELLED "OUTPUT 4 BLACK SUMS"

A flow chart for the processing labelled "OUTPUT 4 BLACK SUMS" is given in FIG. 35. If the current input line is the first input line to contribute to an output line, this processing consists of writing V4SUMS into HO(OIX) and incrementing OIX by 2, as shown in FIG. 35(a). If the current input line is not the first input line to contribute at an output line, this processing consists of adding V4SUMS to HO(OIX) and incrementing OIX by 2, as shown in FIG. 35(b). While specific embodiments of the invention have been described in this specification, it should be apparent that many changes can be made to the embodiments which are specifically illustrated and described, within the spirit and scope of the invention which is to be construed in accordance with the attached claims.

Having thus described our invention, what we claim as new, and desire to secure by Letters Patent is:

1. A method of displaying an operator selected portion of an image, on a display with inadequate area to perceivably display the entire image simultaneously, comprising the steps of:

(a) dividing the image area into at least first and second area segments, each of said segments being perceivably displayable by the pixels within said display area;
    (b) storing representation information of the first segment in a multi-bit plane buffer using a first group of bit planes comprising less than all of the bit planes in said buffer;
    (c) storing representation information of the second segment in the multi-bit plane buffer using a second, distinct, group of said bit planes; and
    (d) displaying an operator selected portion of said image area on said display by selecting, for each pixel of said display, representation information, as appropriate, from the first or the second group of bit planes, in accordance with the portions of the area segments making up said selected area portion.

2. The method of claim 1 wherein said representation information is in the form of bytes and in which said step (d) includes the further steps of:

(i) writing, in one or more unused bit planes of said buffer, control data indicating whether said display is to be driven by representation information from the first or second group of bit planes;
    (ii) reading a fixed portion of said buffer, said portion being equal in size to said display and the reading being modulo the size of said buffer, beginning at an operator selected address, and for each byte read, selecting bits from the first or second group of bit planes in accordance with the information indicated by said control data; and
    (iii) driving said display from the information selected in step (ii).

3. The method of claim 1 wherein said representation information is in the form of bytes and in which said display is scrolled through the image by, (i) writing in a control buffer, control data indicating whether said display is to be driven by information from the first or second group of bit planes;
    (ii) reading a fixed portion of said multi-bit plane buffer, said portion being equal in size to said display, and the reading being modulo the size of said buffer beginning at an operator selected address, and for each byte read, selecting bits from the first or second group of bit planes in accordance with the information indicated by said control data;
    (iii) driving said display from the information selected in step (ii);
    (iv) changing the operator selected address at which reading of the multi-bit plane buffer is to begin, and
    (v) rewriting said control data in said control buffer consistent with the operator selected change in address.

4. The method of claim 2 in which said display is scrolled through the image by, (iv) changing the operator selected address at which reading of the multi-bit plane buffer is to begin, and
    (v) rewriting said control data in said buffer consistent with the operator selected change in address.

5. The method of claim 2 in which said first and second group of bit planes each include two bit planes and said image includes at least three segments.

6. The method of claim 5 in which said control data occupies two bit planes.

7. A method of displaying an operator selected image from among a plurality of images, on a display having an area equal to or greater than that of any of said images but with inadequate area to perceivably display all the images simultaneously, comprising the steps of:

(a) storing a representation of one of said images in the form of data bytes in a multi-bit plane buffer using a first group of bit planes comprising less than all the bit planes in said buffer;

(b) similarly storing a representation of another of said images in the multi-bit plane buffer using a second, distinct, group of said bit planes;

(c) writing, in one or more unused bit planes of said buffer, control data indicating whether said display is to be driven by information from the first or second group of bit planes; and (d) reading said buffer in sequence and for each byte read selecting bits from the first or second group of bit planes in dependence on said control data; and (e) driving said display from the bit information selected.

8. The method of claim 7 in which said display is scrolled through the plurality of images by, (f) beginning said reading step at an operator selected address in said buffer;

(g) changing the operator selected address at which reading of said buffer is to begin; and (h) rewriting said control data in said buffer consistent with the operator selected change in address.

9. The method of claim 7 in which said buffer includes eight bit planes, each group of bit planes includes only a single bit plane and which includes the further steps of:

(f) storing a representation of up to four other images in said multi-bit plane buffer using up to four other bit planes; and (g) using the remaining three bit planes as a group for control bits.

10. The method of claim 7 in which said buffer includes eight bit planes, each group of bit planes includes two bit planes and which includes the further step of:

(f) storing a representation of up to two other images in said multi-bit plane buffer using another pair of bit planes for each of said two other images; and (g) using the remaining two bit planes as a group for control bits.

11. The method of claim 7 in which said buffer includes eight bit planes and each group of bit planes includes three bit planes and which includes the further step of storing control data for selecting between said two groups of bit planes in another of said bit planes to derive information with which to drive said display.

12. The method of claim 7 in which said buffer includes eight bit planes, each group of bit planes includes only a single bit plane and which includes the further steps of:

(d) storing a representation of up to three other images in said mult-bit plane buffer using three other bit planes, and (e) storing control data for selecting among said bit planes groups in others of said bit planes.

13. A method of translating a two tone image to a gray scale video image comprising the steps of:

(a) providing a table representing numerical values for the effect of transitions in said two tone image on said video image;

(b) loading an input buffer with a representation of said two tone image;

(c) initializing an output buffer with a numerical value to represent a gray scale image consisting of only one of said tones;

(d) examining said input buffer to locate a transition therein and determining the location of the transition;

(e) extracting, from said table, a numerical value corresponding to the location of said transition;

(f) summing said extracted value, using alternating signs for said value on alternate summations, with the contents of said output buffer;

(g) and repeating in sequence steps (d), (e) and (f) until each transition in said input buffer is processed, wherein said value is considered to have a sign opposite to a sign of the contents of said output buffer for an initial execution of said summing step.

14. The method of claim 13 which includes the further steps of:

(d1) determining if the transition is located more than a fixed distance from a reference location; and (d2) in the event said transition is located further than said fixed distance from said reference location, summing a constant, of the largest numerical value in said table, with the contents of said output buffer.

15. The method of claim 13 in which the step (a) comprises:

(a1) limiting said table to the effect of transitions located no greater than a fixed distance from a reference location, and in which said step (f) includes (f1) summing a constant with the contents of the output buffer for locations greater than said fixed distance from a reference location.

16. The method of claim 13 in which said two tone image is decomposed into units of a fixed dimension for which said video image has a corresponding fixed dimension, and which a ratio of two tone image units to said video image units is not an integer.

17. The method of claim 16 in which said two tone image is decomposed into units of 13 pels per unit for which said corresponding video image is 4 pixels so that said ratio is 13/4.

18. The method of claim 13 in which said tone used to initialize said output buffer corresponds to white and not black and wherein said transition used as a first transition is a white/black transition.

19. The method of claim 13 in which said examining step includes subtracting, in modulo arithmetic an effect for that portion of white runs of length less than a predetermined length in said two tone image and in which said table is provided with numerical values only for those transitions which are located less than said predetermined length from a reference location.

20. The method of claim 13 in which said step (d) comprises:

(d1) locating a first white/black transition and counting modulo n, where n is an integer on which said table is based, a distance to said first white/black transition, said distance comprising the whole number I counted to and the fractional remainder r, modulo n, (d2) summing the contents of said output buffer with a numerical value directly proportional to I and of sign opposite to a sign for the contents of said output buffer so that the result is the difference between the original contents of said output buffer and said numerical value, and said step (e) includes using said remainder r with which to access said table.

21. The method of claim 20 in which said step (d) further comprises:
- (d3) locating a succeeding black/white transition and determining, by counting modulo n, the distance to said transition location from a reference location for said black/white transition, said distance comprising the number J counted to and the fractional remainder o, modulo n,
- (d4) summing the contents of said output buffer with a numerical value directly proportional to J and with a like sign so that the result is the arithmetic sum of the contents of the output buffer and the numerical value, and wherein said step (e) uses the remainder o with which to access said table.

22. The method of claim 21 in which said steps (d), (d1), (d2), (e) and (f) are repeated for white/black transitions and said steps (d), (d3), (d4), (e) and (f) are repeated for black/white transitions.

23. A computerized method for constructing from a binary image in run length representation, a multi-bit representation of said binary image, displayable in multiple shades of gray and reduced in the horizontal dimension by a horizontal reduction factor HR and/or the vertical dimension by a vertical reduction factor VR, comprising the steps of:

providing an accumulation register capable of holding a given number N of sums of image pel values, each of said sums having b bits of the accumulation register allocated therefor;

obtaining a set of input lines forming a portion of said image in run length representation, the number of lines in said set being equal to VR; processing the run length representations of each input line to accumulate vectors of sums of pel values along said input lines, in said accumulation register, said sums corresponding to the number of pels of value 1 in each of successive groups of pels along said lines, the number of pels in each of said groups being equal to HR, and each of said vectors consisting of N sums; and totalling vectors of said sums for said set of input lines to produce a displayable output line of multi-bit totals, according to the steps of:

processing the first input line of said set of input lines by, initially testing said first input line to determine if said input line is composed of pels entirely of value 0, and writing said output line entirely with sums of value 0, in response to a positive determination, and with the number of pels contributing to each sum equalling said horizontal reduction factor;

processing the run length representations in said first input line from beginning to end in response to a negative determination by the steps of:

further testing the beginning of the unprocessed data run length representations in said first input line for a run length and comparing said length to a count C equal to the product of N and HR; determining if said length of the run is greater than or equal to said count C, and upon a positive determination, selecting and storing one of two precomputed vectors of sums in said accumulation register and writing said selected vector to said output line, said precomputed vectors comprising N sums of value 0 and N sums of value HR, respectively, and said selecting comprising testing the value of the pels represented in the run and selecting the vector of N sums of value 0 in response to 0 pel values and the vector of N sums of value HR in response to pel values of 1; and repeating said testing, determining, selecting, storing and writing while the lengths of the unprocessed runs in said input line exceed or equal said count C;

upon determining that said length of the run is less than said count, accumulating a multiplicity of sums, equal to N, by the steps of:

initializing said accumulation register to a precomputed vector of sums Q, which when shifted by b bits per shift up to and including N-1 times retains a most significant bit of 1, but when shifted N times becomes 0;

computing sums one at a time from the beginning of the unprocessed run length representations; adding each newly-computed sum to said accumulation register;

after each new sum has been added to said accumulation register, testing said accumulation register to determine if said accumulation register can accomodate another sum, and shifting the contents of said register b bits to accomodate another sum upon a positive determination and writing the contents of said accumulation register to said output line upon a negative determination; and processing subsequent input lines of said set of input lines, one at a time by, initially testing a subsequent input line of said set to determine and if said subsequent input line is entirely composed of pels of value 0, and in response to a negative determination processing the run length representations of said input line from beginning to end by the steps of:

further testing the beginning of the unprocessed run length representations for a run length and comparing said length to said count C to determine if said length of the run is greater than or equal to said count C, and in response to a positive determination, when the value of the pels of the run is 0, proceeding until this is no longer true; and when the value of the pels of the run is 1, storing a vector of N sums of value HR in the accumulation register and adding said vector to said output line by adding its sums to the vector of partial totals in said output line corresponding to pels in earlier input lines of said set that are vertically aligned with the pels contributing to said added sums while the length of the run of unprocessed pels exceeds or equals said count to produce a multi-bit representation of said set of lines; and upon a negative determination, accumulating a multiplicity of sums in said accumulation register by the steps of:

initializing said accumulation register to Q; computing sums one at a time from the beginning of the unprocessed run-end input data run length representations; adding each newly-computed sum to said accumulation register; after each new sum has been added to said accumulation register, testing said accumulation register to determine if said accumulation register can accomodate another sum, and shifting the contents of said register b bits to accomodate another sum in response to a positive determination, and adding the contents of said accumulation register to the vector of partial totals already stored in the output line by adding the sums in said register to the partial totals in said output line corresponding to the pels in earlier input lines of said set that are vertically aligned with the pels contributing to said added sums, in response to a negative determination, to produce a multi-bit representation of said set of lines;

obtaining further sets of input lines forming the remaining portions of said image in run length representation; and repeating the processing of said remaining sets of input lines of said image in accordance with the preceding steps until all of the input lines have been reconstructed into output lines forming a displayable image in multi-bit representation representing said binary image reduced in size and in multiple shades of gray.

24. A method as in claim 23 further comprising the steps of: when after testing, an input line is not entirely composed of pels of value 0, appending a relatively long run of pels of value 0 to the end of said input line; and subsequently testing said input line for its end after processing a long run of pels of value 0.

25. A method as in claim 23 further comprising the steps of: deferring the writing of said output line until said input line is not composed entirely of pels of value 0; and when all input lines of a set are composed entirely of pels of value 0 then setting a flag to so indicate.

26. A system for electronically converting a binary image in run length form to a multi-bit representation, which is displayable as an output image in multiple shades of gray, reduced in the horizontal dimension by a horizontal reduction factor HR and/or the vertical dimension by a vertical reduction factor VR as compared to said binary image, comprising:

means for storing a displayable multi-bit representation of a binary image;

accumulation register means for holding a given number N of sums of image pel values and having b bits allocated for each of said sums;

means for obtaining a set of input lines forming a portion of said image in run length representation, the number of lines in said set being equal to VR;

means for processing the run length representations of each input line to accumulate vectors of sums of pel values along said input lines in said accumulation register means, said sums corresponding to the number of pels of value 1 in each of successive groups of pels along said lines, the number of pels in each of said groups being equal to HR, and each of said vectors consisting of N sums;

means for totalling vectors of said sums for said set of input lines in said register means to create a displayable output line of multi-bit totals; and means for writing said output line of multi-bit totals to said storing means;

said processing means comprising:

means for initially testing the first input line of said set to determine if it is composed of pels entirely of value 0;

means for actuating said writing means to write an output line entirely with sums of value 0, in response to a positive determination; and means for actuating said processing means to process the run length representations in said first input line from beginning to end in response to a negative determination, comprising:

means for further testing the beginning of the unprocessed run-length representations in said first input line for a run length and comparing said length to a count C equal to the product of N and HR;

means for determining if said length of the run is greater than or equal to said count C;

means for selecting and storing one of two precomputed vectors of sums in the accumulation register means in response to a positive determination, said precomputed vectors comprising N sums of value 0 and N sums of value HR, respectively, and said selecting comprising testing the value of the pels represented in the run and selecting the vector of N sums of value 0 in response to 0 pel values and the vector of N sums of value HR in response to pel values of 1;

means for actuating said writing means to write said selected vector as an output line to said storing means, upon storage in said accumulation register means;

means for reactuating said further testing means, said determining means, said selecting and storing means, and said writing means while the lengths of the unprocessed runs in the input line exceed or equal count C; and means for accumulating N sums in said accumulation register means upon a determination by said determining means that the length of the run is less than count C, comprising:

means for initializing said accumulation register means to a precomputed vector of sums Q, which when shifted by b bits per shift up to and including N-1 times retains a most significant bit of 1, but when shifted N times becomes 0;

means for computing sums one at a time from the beginning of the unprocessed run length representations;

means for adding each newly-computed sum to said accumulation register means;

means for testing said accumulation register means to determine if said accumulation register means can accomodate another sum, after each new sum has been added to said accumulation register means;

means for shifting the contents of said accumulation register means b bits to accomodate another sum upon a positive determination; and means for actuating said writing means to write the contents of said accumulation register means to an output line in said storing means upon a negative determination;

means for actuating said processing means to process subsequent input lines of said set of input lines one at a time, comprising:

means for initially testing a subsequent input line of said set to determine if said input line is entirely composed of pels of value 0; and means, responsive to a negative determination, for processing the run length representations of said input line from beginning to end, comprising:

means for further testing the beginning of the unprocessed run-length representations for a run length and comparing said length to count C to determine if said length of the run is greater than or equal to count C;

means, responsive to a positive determination, for proceeding when the value of the pels of the run is zero until this is no longer true, and when the value of the pels of the run are 1, for storing a vector of N sums of value HR in the accumulation register means;

means for adding said vector to the output line in said storing means by adding its sums to the vector of partial totals in said output line corresponding to pels in earlier input lines of said set that are vertically aligned with the pels contributing to said added sums, while the length of the run of unprocessed pels exceeds or equals said count C, to produce a multi-bit representation of said set of lines in said storing means; and means, upon a negative determination, for accumulating a multiplicity of sums in said accumulation register means, comprising:

means for initializing said accumulation register means to Q;

means for computing sums one at a time from the beginning of the unprocessed run length representations;

means for adding each newly-computed sum to said accumulation register means;

means for testing said accumulation register means to determine if said accumulation register means can accomodate another sum, after each new sum has been added thereto;

means for shifting the contents of said register means b bits to accomodate another sum in response to a positive determination; and means for adding the contents of said accumulation register means to the vector of partial totals already stored in the output line by adding the sums in said contents to the partial totals in said storing means with correspondence between the pels contributing to said added sums and the pels in earlier input lines of said set that are vertically aligned therewith, in response to a negative determination, to produce a multi-bit representation of said set of lines;

means for obtaining further sets of input lines forming the remaining portions of said image in run length representation; and means for reactuating said means for actuating said processing means to process subsequent input lines of said set of input lines one at a time, to process said remaining sets of input lines of said image until all of the input lines have been reconstructed into output lines forming a multi-bit representation of said binary image that is displayable as an output image in multiple shades of gray and reduced in size as compared to said binary image.

27. A system as in claim 26 further comprising:
means for appending a relatively long run of pels of value 0 to the end of said input line, when after testing, an input line is not entirely composed of pels of value 0; and
means for subsequently testing said input line for its end after a long run of pels of value 0 have been processed.

28. A system as in claim 26 further comprising:
means for deferring the writing of said output line until said input line is not composed entirely of pels of value 0; and
means, when all input lines of a set are composed entirely of pels of value 0, for setting a flag to so indicate.

29. A system for displaying an operator selected portion of an image, on a display with inadequate area to perceivably display the entire image simultaneously, comprising:
(a) a multi-bit plane buffer;
(b) means for dividing the area of an image into at least first and second area segments, each of said segments being perceivably displayable by the pixels within the area of said display;
(c) means for storing representation information of the first segment in said multi-bit plane buffer using a first group of bit planes comprising less than all of the bit planes in said buffer;
(d) means for storing representation information of the second segment in the multi-bit plane buffer using a second, distinct, group of said bit planes; and
(e) means for providing an operator selected portion of said image area to said display by selecting, for each pixel of said display, representation information, as appropriate, either from the first or the second group of bit planes, in accordance with the portions of the area segments making up said selected area portion.

30. The system of claim 29 in which said providing means comprises:
(i) means for writing, in one or more unused bit planes of said buffer, control data indicating whether said display is to be driven by representation information from the first or second group of bit planes;
(ii) means for reading a fixed portion of said buffer, said portion being equal in size to said display and said reading being modulo the size of said buffer, beginning at an operator selected address, and for each byte read, selecting bits from the first or second group of bit planes in accordance with the information indicated by said control data; and
(iii) means for driving said display from the information selected by said reading means.

31. The system of claim 29 in which said display is scrolled through the image by means comprising:
(iv) means for changing the operator selected address at which reading of said first or second bit plane groups in the multi-bit plane buffer is to begin; and
(v) means for rewriting said control data in said buffer consistent with the operator selected change in address.

32. The system of claim 29 in which said display is scrolled through the image by means comprising:
(i) a control buffer;
(ii) means for writing in said control buffer, control data indicating whether said display is to be driven by information from the first or second group of bit planes;
(ii) means for reading a fixed portion of said multi-bit plane buffer, said portion being equal in size to said display and said reading being modulo the size of said buffer, beginning at an operator selected address, and for each byte read, selecting bits from the first or second group of bit planes in accordance with the information indicated by said control data;
(iii) means for driving said display from the information selected by said reading means;
(iv) means for changing the operator selected address at which reading of the multi-bit plane buffer is to begin; and (v) means for rewriting said control data in said control buffer consistent with the operator selected change in address.

33. A system for displaying an operator selected image from among a plurality of images, on a display having an area equal to or greater than that of any of said images but with inadequate area to perceivably display all the images simultaneously, comprising:
(a) a multi-bit plane buffer:
(b) means for storing a representation of one of said images in the form of data bytes in said multi-bit plane buffer using a first group of bit planes comprising less than all the bit planes in said buffer;
(c) means for similarly storing a representation of another of said images in the multi-bit plane buffer using a second, distinct, group of said bit planes;
(d) means for writing, in one or more unused bit planes of said buffer, control data indicating whether said display is to be driven by information from the first or second group of bit planes; and
(e) means for reading said buffer in sequence and for each byte read, selecting bits from the first or second group of bit planes in dependence on said control data; and
(f) means for driving said display from the bit information selected by said reading and selecting means.

34. The system of claim 33 in which said display is scrolled through the plurality of images by means comprising:
means for accepting addresses selected by an operator of said system;
(g) means for actuating said reading means to begin reading at an operator selected address in said buffer;
(h) means for changing the operator selected address at which reading of said buffer is to begin; and
(i) means for rewriting said control data in said buffer consistent with the operator selected change in address.

35. A system for translating a two tone image to a gray scale video image comprising:
(a) a table representing numerical values for the effect of transitions in said two tone image on said video image;
(b) an input buffer and an output buffer;
(c) means for loading said input buffer with a representation of said two tone image;
(d) means for initializing said output buffer with a numerical value to represent a gray scale image consisting of only one of said tones;
(e) means for examining said input buffer to locate a transition therein and determining the location of the transition;
(f) means for extracting, from said table, a numerical value corresponding to the location of said transition;
(g) means for summing said extracted value, using alternating signs for said value on alternate summations, with the contents of said output buffer; and
(h) means for reactivating in sequence said examining, extracting, and summing means until each transition in said input buffer is processed, wherein said value is considered to have a sign opposite to a sign of the contents of said output buffer for an initial execution of said summing step.

36. The system of claim 35 wherein said examining means comprises:
(d1) means for locating a first white/black transition and counting modulo n, where n is an integer on which said table is based, a distance to said first white/black transition, said distance comprising the whole number I counted to and the fractional remainder r, modulo n;
(d2) means for summing the contents of said output buffer with a numerical value directly proportional to I and of sign opposite to a sign for the contents of said output buffer so that the result is the difference between the original contents of said output buffer and said numerical value;
and wherein said extracting means uses said remainder r with which to access said table.

37. The system of claim 36 wherein said examining means further comprises:
(d3) means for locating a succeeding black/white transition and determining, by counting modulo n, the distance to said transition location from a reference location for said black/white transition, said distance comprising the number J counted to and the fractional remainder o, modulo n;
(d4) means for summing the contents of said output buffer with a numerical value directly proportional to J and with a like sign so that the result is the arithmetic sum of the contents of the output buffer and the numerical value;
and wherein said extracting means uses said remainder o with which to access said table.

* * * * *